US011343301B2

(12) United States Patent
Hodgkinson et al.

(10) Patent No.: US 11,343,301 B2
(45) Date of Patent: May 24, 2022

(54) MANAGING JITTER BUFFER LENGTH FOR IMPROVED AUDIO QUALITY

(71) Applicant: LOGMEIN, Inc., Boston, MA (US)

(72) Inventors: Matthieu Hodgkinson, Dresden (DE); Florian Heese, Dresden (DE); Georg Bannasch, Dresden (DE)

(73) Assignee: GoTo Group, Inc., Boston, MA (US)

( * ) Notice: Subject to any disclaimer, the term of this patent is extended or adjusted under 35 U.S.C. 154(b) by 196 days.

(21) Appl. No.: 16/707,326

(22) Filed: Dec. 9, 2019

(65) Prior Publication Data

US 2020/0112600 A1 Apr. 9, 2020

Related U.S. Application Data

(63) Continuation-in-part of application No. 15/827,387, filed on Nov. 30, 2017, now Pat. No. 10,504,536.

(51) Int. Cl.
| | |
|---|---|
| *H04L 65/80* | (2022.01) |
| *G10L 25/60* | (2013.01) |
| *G10L 19/005* | (2013.01) |
| *H04L 47/32* | (2022.01) |
| *H04L 49/552* | (2022.01) |
| *H04L 47/62* | (2022.01) |

(Continued)

(52) U.S. Cl.
CPC ............ *H04L 65/80* (2013.01); *G10L 19/005* (2013.01); *G10L 25/60* (2013.01); *H04L 1/0047* (2013.01); *H04L 47/283* (2013.01); *H04L 47/32* (2013.01); *H04L 47/624* (2013.01); *H04L 49/552* (2013.01)

(58) Field of Classification Search
CPC ...... H04L 1/0047; H04L 47/283; H04L 47/32; H04L 47/624; H04L 49/552; H04L 65/80; G10L 19/005; G10L 25/60
See application file for complete search history.

(56) References Cited

U.S. PATENT DOCUMENTS 5,715,372 A    2/1998 Meyers et al.
6,038,536 A *  3/2000 Haroun ............... H03M 7/30
                                        704/229
(Continued)

FOREIGN PATENT DOCUMENTS

CN    101309331 A  * 11/2008

OTHER PUBLICATIONS

Google Translation of CN 101309331A, https://patents.google.com/patent/CN101309331A/en?oq=CN 101309331A (Year: 2008).*

(Continued)

*Primary Examiner* — Eric Yen
(74) *Attorney, Agent, or Firm* — BainwoodHuang

(57) ABSTRACT

A technique for managing real-time communications includes generating, during a communication session between at least a first computing device and a second computing device over a computer network, multiple audio factors of the communication session, each of the audio factors being susceptible to degradation in a way that affects audio quality of the communication session. The technique further includes combining the audio factors to produce an overall measure of audio quality and taking remedial action to improve the overall measure of audio quality by adjusting a setting on the first computing device.

19 Claims, 14 Drawing Sheets

(51) Int. Cl.
*H04L 1/00* (2006.01)
*H04L 47/283* (2022.01)

(56) References Cited

U.S. PATENT DOCUMENTS

| | | | | |
|---|---|---|---|---|
| 6,072,809 | A * | 6/2000 | Agrawal | H04J 3/0632 370/503 |
| 6,360,271 | B1 * | 3/2002 | Schuster | H04J 3/0632 370/516 |
| 6,366,959 | B1 * | 4/2002 | Sidhu | H04L 65/604 709/214 |
| 6,377,931 | B1 * | 4/2002 | Shlomot | G10L 21/04 369/44.32 |
| 6,658,027 | B1 | 12/2003 | Kramer et al. | |
| 6,738,916 | B1 * | 5/2004 | Gladden | H04J 3/0632 710/52 |
| 6,754,311 | B1 | 6/2004 | Kampmeier et al. | |
| 6,862,298 | B1 | 3/2005 | Smith et al. | |
| 6,963,860 | B1 | 11/2005 | Tsutsui et al. | |
| 7,024,475 | B1 * | 4/2006 | Abaye | H04L 41/145 703/13 |
| 7,246,057 | B1 * | 7/2007 | Sundqvist | H04L 12/6418 704/219 |
| 7,480,500 | B1 * | 1/2009 | Mittal | H04L 67/147 455/403 |
| 7,525,952 | B1 * | 4/2009 | Shankar | H04L 41/5009 370/352 |
| 7,796,524 | B1 | 9/2010 | O' et al. | |
| 7,852,882 | B2 | 12/2010 | Jougit et al. | |
| 8,467,321 | B1 | 6/2013 | Groenjes et al. | |
| 10,334,469 | B1 * | 6/2019 | Salour | H04W 24/06 |
| 2002/0007429 | A1 * | 1/2002 | Boulandet | H04L 43/087 710/52 |
| 2002/0107593 | A1 | 8/2002 | Rabipour et al. | |
| 2003/0088690 | A1 * | 5/2003 | Zuckerman | H04L 47/26 709/232 |
| 2003/0093267 | A1 * | 5/2003 | Leichtling | G10L 19/167 704/215 |
| 2004/0170164 | A1 * | 9/2004 | LeBlanc | H04L 65/607 370/389 |
| 2004/0186731 | A1 | 9/2004 | Takahashi et al. | |
| 2005/0261897 | A1 * | 11/2005 | Jelinek | G10L 19/20 704/E19.017 |
| 2006/0256679 | A1 * | 11/2006 | Chang | G11B 7/1263 369/47.5 |
| 2007/0008899 | A1 | 1/2007 | Shim et al. | |
| 2008/0049795 | A1 * | 2/2008 | Lakaniemi | H04R 49/90 370/516 |
| 2008/0151769 | A1 * | 6/2008 | El-Hennawey | H04L 65/80 370/252 |
| 2008/0212567 | A1 * | 9/2008 | El-Hennawey | H04L 65/80 370/352 |
| 2008/0219175 | A1 * | 9/2008 | Bedrosian | H04L 12/66 370/250 |
| 2010/0152869 | A1 | 6/2010 | Morrison et al. | |
| 2010/0265834 | A1 * | 10/2010 | Michaelis | H04L 65/80 370/252 |
| 2010/0329141 | A1 * | 12/2010 | Apostol | H04L 47/22 370/252 |
| 2011/0022358 | A1 | 1/2011 | Han et al. | |
| 2011/0142079 | A1 * | 6/2011 | Wong | H04L 43/0858 370/503 |
| 2011/0268023 | A1 | 11/2011 | Srinivasan et al. | |
| 2012/0062791 | A1 | 3/2012 | Thakolsri et al. | |
| 2014/0072000 | A1 * | 3/2014 | Shiva | H04J 3/0632 370/516 |
| 2015/0154977 | A1 * | 6/2015 | Ekman | G10L 21/0208 381/66 |
| 2015/0341824 | A1 | 11/2015 | Ge | |
| 2016/0044568 | A1 * | 2/2016 | White | H04W 36/0022 370/332 |
| 2016/0094479 | A1 | 3/2016 | Dwarkha et al. | |
| 2016/0105473 | A1 * | 4/2016 | Klingbeil | H04L 47/30 370/260 |
| 2017/0019346 | A1 * | 1/2017 | Hayama | H04L 67/18 |
| 2017/0034026 | A1 * | 2/2017 | Li | G10L 25/93 |
| 2017/0063704 | A1 * | 3/2017 | Krinsky | H04B 17/309 |
| 2018/0035223 | A1 * | 2/2018 | Vicinus | H04R 3/02 |
| 2021/0037281 | A1 * | 2/2021 | Xian | H04N 21/2401 |

OTHER PUBLICATIONS

Joachim Pomy; "POLQA—The Next-Generation Mobile Voice Quality Testing Standard"; Apr. 27-29, 2011; 37 pages.

"Perceptual Evaluation of Speech Quality (PESQ) Measurement Description"; Oct. 26, 2010; 3 pages.

ITU-T—Series G: Transmission Systems and Media, Digital Systems and Networks; Jun. 2015; 30 pages.

"VOIP Quality Monitoring Basics Mean Opinion Score(MOS)Calculation and Aggregation"; 2015; 8 pages.

* cited by examiner

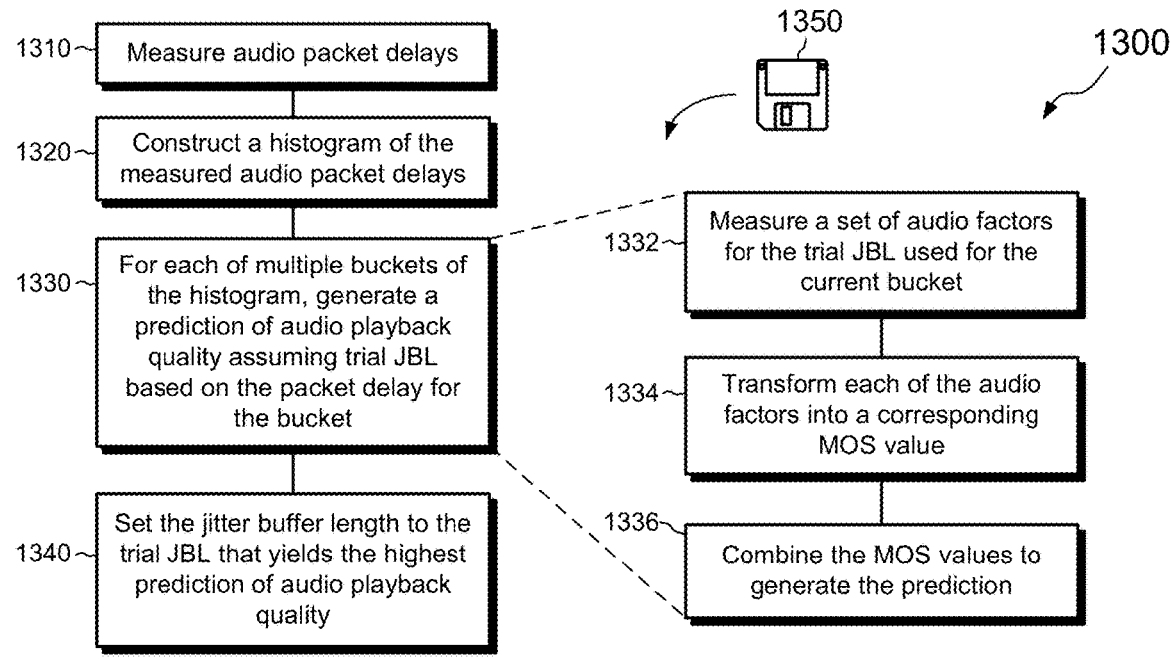
FIG. 13
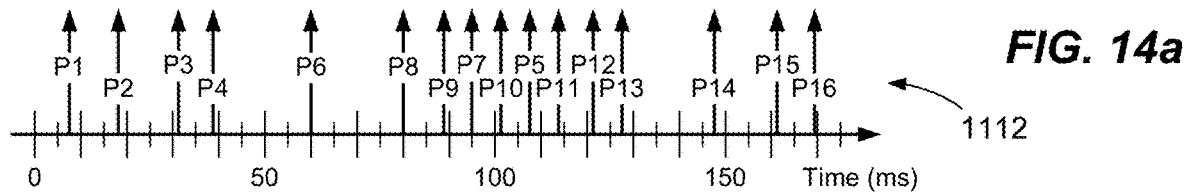
FIG. 14a
| Packet | Delay (Rel) | Delay (Norm) |
|--------|-------------|--------------|
| P1 | -3 | 0 |
| P2 | -2 | 1 |
| P3 | +1 | 4 |
| P4 | -1 | 2 |
| P5 | +57 | 60 |
| P6 | 0 | 3 |
| P7 | +25 | 28 |
| P8 | 0 | 3 |
| P9 | -1 | 2 |
| P10 | +2 | 5 |
| P11 | +4 | 7 |
| P12 | +1 | 4 |
| P13 | -3 | 0 |
| P14 | +7 | 10 |
| P15 | +1 | 4 |
| P16 | +9 | 12 |
FIG. 14b
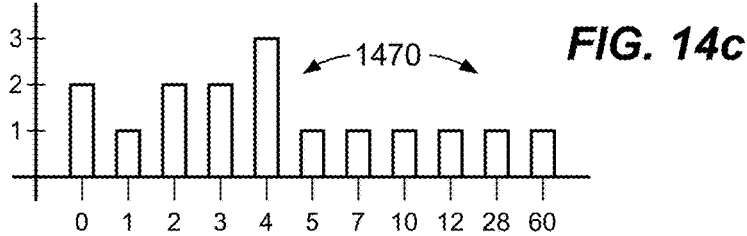
FIG. 14c

MANAGING JITTER BUFFER LENGTH FOR IMPROVED AUDIO QUALITY

CROSS-REFERENCE(S) TO RELATED APPLICATION(S)

This application is a continuation-in-part of copending U.S. application Ser. No. 15/827,387, filed Nov. 30, 2017, the contents and teachings of which are incorporated herein by reference in their entirety.

BACKGROUND

Communication technologies increasingly use computer equipment and computer networks for conveying voice and other audio content in real time between parties. For example, commercially-available computers, tablets, smart phones, and the like often include some form of audio chat, video chat, and/or web conferencing application, which is built in to the devices' operating systems and/or is readily available for download and installation on user devices. These communication technologies rely upon high-quality audio for their success.

Many factors can degrade audio quality in real-time communications, impairing user experience. For example, long network delays can cause latency or echo. Ambient and electronic noise can impair intelligibility. Dropped network packets can introduce pops, crackles, and robotic-sounding speech. Damaged or improperly placed microphones and speakers can cause distortion.

Various approaches are known in the art for estimating audio quality in electronic communications. For example, the ETSI (European Telecommunications Standards Institute) has developed the E-model for estimating conversational quality from the mouth of a speaker to the ear of a listener over an electronic medium. The E-model includes terms that specify various impairments, e.g., delays, low bit-rate codecs (encoder/decoders), packet losses, and the like. Additional information about the E-model may be found in "G.107: The E-model: a computational model for use in transmission planning," which may be found online at https://www.itu.int/rec/T-REC-G.107-201506-I/en. In addition, PESQ (Perceptual Evaluation of Speech Quality) provides a family of standards for automated assessment of speech quality as experienced by a user of a telephony system. PESQ is standardized as ITU-T recommendation P.862. Further, MOS (Mean Opinion Score) provides an assessment of audio quality based on scores provided by human subjects. Various forms of MOS are standardized as ITU-T recommendation P.800.1.

SUMMARY

Unfortunately, conventional approaches for estimating audio quality are limited in their applications. The E-model is primarily intended for offline network planning, i.e., for designing a network to support audio communications, with certain specific sources of audio distortion in mind and without the ability to easily extend to new sources of audio distortion. Further, the E-model requires a high level of expertise to properly use and is not something that can easily be learned by novices. PESQ and MOS generally require comparisons with a reference signal, but reference signals are usually not available during real-time communications.

In contrast with prior approaches, an improved technique for estimating and enhancing audio quality in a real-time communication session between parties over a computer network produces real-time measurements of factors that are known to impact audio quality, assigns a separate MOS value to each of the measured factors, and combines the MOS values for the various factors to produce an overall measure of audio quality. At least one party to the real-time communication session operates a computing device that runs a software program, and the technique further includes directing the software program to render an indication of the overall audio quality, thereby enabling the party operating the computing device to take remedial action to improve the audio quality. Advantageously, embodiments of the improved technique operate in real time, are extendable to new sources of audio distortion, and are easy for application developers and information technology professionals to learn and use.

Independently of the above, it would further be desirable to automatically vary a setting of a computing device to improve audio quality of playback during a communication session. To this end, certain embodiments are directed to a method for managing real-time communications. The method includes generating, during a communication session between at least a first computing device and a second computing device over a computer network, multiple audio factors of the communication session, each of the audio factors being susceptible to degradation in a way that affects audio quality of the communication session. The method further includes combining the audio factors to produce an overall measure of audio quality and taking remedial action to improve the overall measure of audio quality by adjusting a setting on the first computing device.

Other embodiments are directed to a computerized apparatus constructed and arranged to perform a method of improving audio quality in real-time communications, such as the method described above. Still other embodiments are directed to a computer program product. The computer program product stores instructions which, when executed on control circuitry of a computerized apparatus, cause the computerized apparatus to perform a method of improving audio quality in real-time communications, such as the method described above.

In some examples, the setting being adjusted is the length of a jitter buffer configured to temporarily hold audio data received by the first computing device over the computer network prior to decoding the audio data.

According to some examples, the audio data is received in multiple packets, each packet having a sequence identifier that indicates a sequence of audio samples included in the respective packet relative to other packets. The method further includes ordering the audio data in the jitter buffer based on sequence identifier and providing the ordered audio data to an audio decoder configured to decode the audio data.

According to some variants, each sequence identifier includes a respective sample index of an audio sample transmitted in the respective packet, the sample index increasing monotonically for successive audio samples.

According to some examples, the ordered audio data includes a gap where a packet is missing. The method further includes receiving the missing packet, after the decoder has processed a portion of the ordered audio data corresponding to the gap, and discarding the missing packet after it has been received.

In some examples, the method further includes performing a jitter-buffer-length optimization by: measuring packet delays of a plurality of packets received by the first computing device, each of the plurality of packets carrying a respective set of audio samples; constructing a histogram of the measured packet delays, the histogram including a set of buckets, each bucket representing a respective packet delay range and counting a number of audio samples that arrived in packets having delays within the respective packet delay range; for each of the set of buckets, generating a prediction of audio playback quality for a trial jitter buffer length set based on the packet delay range represented by the respective bucket; and setting the jitter buffer length based on the trial jitter buffer length for which the highest audio playback quality is predicted.

In some examples, generating the prediction of audio playback quality includes, for each of the set of buckets: providing a set of audio factors for the trial jitter buffer length used for the respective bucket; transforming each of the set of audio factors provided for the respective bucket into a corresponding MOS (Mean Opinion Score) value, each MOS value providing a standardized measure of audio quality; and combining the set of MOS values to generate the prediction of audio playback quality for the respective bucket.

In some examples, the set of audio factors includes a delay impairment factor generated by a delay impairment estimator. The delay impairment estimator receives a first input that provides a current or trial jitter buffer length, receives a second input that indicates a measure of audio interactivity between the first computing device and the second computing device, and provides an output that conveys a measure of audio quality based on the first input and the second input. According to some variants, the delay impairment estimator further receives a third input that indicates a two-way mouth-to-ear (MTE) delay between the first computing device and the second computing device, and the output is further based on a two-way mouth-to-ear (MTE) delay.

In some examples, the set of audio factors includes a loss impairment factor generated by a loss impairment estimator. The loss impairment estimator receives an input that provides the trial jitter buffer length, tracks gaps in audio data presented to the decoder, the gaps arising from packets that were expected but did not arrive within the current or trial jitter buffer length, and provides an output that conveys a measure of audio quality based on the current or trial jitter buffer length and the gaps in the jitter buffer up to that length.

In some examples, the set of audio factors includes a time-scaling impairment factor generated by a time-scaling impairment estimator. The time-scaling impairment estimator receives input that indicates a difference between a current jitter buffer length and a target jitter buffer length, and provides an output that conveys a measure of audio quality based on performing time scaling from the current jitter buffer length to the target jitter buffer length.

According to some examples, combining the audio factors to produce the overall measure of audio quality includes transforming each of the set of audio factors into a corresponding MOS (Mean Opinion Score) value, each MOS value providing a standardized measure of audio quality, and combining the set of MOS values to generate the overall measure of audio quality.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

FIG. 13 is a flowchart that shows an example method of optimizing the length of a jitter buffer in the apparatus of FIG. 11.

FIGS. 14a-14c show various views of arriving packets (FIG. 14a) and data structures (FIGS. 14b and 14c) used by the method of FIG. 13.

DETAILED DESCRIPTION OF THE INVENTION

Embodiments of the invention will now be described. One should appreciate that such embodiments are provided by way of example to illustrate certain features and principles of the invention but that the invention hereof is not limited to the particular embodiments described.

This document is arranged in sections to assist the reader. In what follows,

Section I presents an example environment and technique for estimating audio quality; and Section II presents an application of audio quality estimation for optimizing the length of a jitter buffer.

Section I: Example Environment and Technique for Estimating Audio Quality

A technique for estimating and enhancing audio quality in a real-time communication session between parties over a computer network produces real-time measurements of factors that are known to impact audio quality, assigns a separate MOS value to each of the measured factors, and combines the MOS values for the various factors to produce an overall measure of audio quality.

Figure 1:
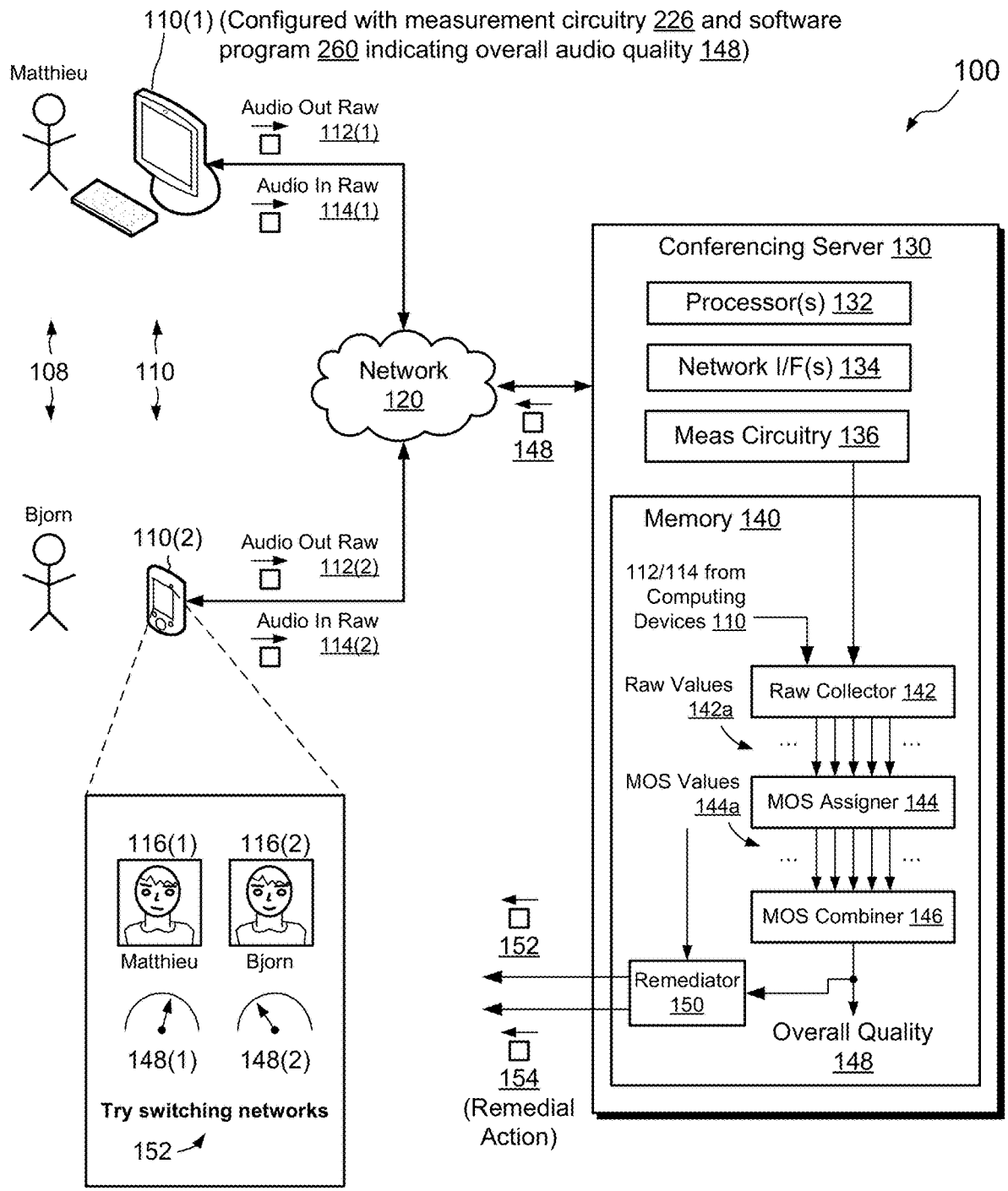
FIG. 1 is a block diagram of an example environment in which embodiments of the improved technique can be practiced.

FIG. 1 shows an example environment 100 in which embodiments of the disclosed technique can be practiced. Here, multiple computing devices 110, such as devices 110(1) and 110(2), are coupled to a network 120, using wired and/or wireless technology. The computing devices 110 may be any type or types of network-connectable devices capable of running software and of supporting audio communications. Examples of computing devices 110 may include desktop computers, laptop computers, tablets, smartphones, PDAs (personal data assistants), set top boxes, intercoms, and the like. The network 120 may be any type of network or combination of networks suitable for conveying computer network traffic, such as a local area network (LAN), a wide area network (WAN), the Internet, a cable television network, and/or some other type of network or combination of networks.

The computing devices 110 are configured to enable users 108 to engage in communication sessions online. Communication sessions may take the form of audio chats, VOIP (voice over Internet protocol) telephone calls, video chats (which include audio), web conferences, web-based educational events, webinars, customer service chats, or the like. In an example, each of the computing devices 110 runs a software program 260, such as an application, process, service, or daemon, for establishing and participating in communication sessions. Each of the computing devices 110 may also include a microphone, speakers, and a display, such as a passive screen or touchscreen. These may be provided as integrated or external components. The microphone and speakers may be provided as user-wearable headset or in any other suitable fashion.

In some examples, one or more of the computing devices 110 include measurement circuitry 226 for measuring factors related to audio quality from their own local perspectives. Factors may include incoming factors, which relate to audio to be sent to speakers, and outgoing factors, which relate to audio captured by a local microphone. Outgoing factors may also relate to synthetic content generated by the respective computing device 110, such as sound effects. Each factor may be measured by a respective detector, and the measurement circuitry 136 may include any number of detectors. Examples of factors measured by detectors include the following:

Whether speakers are connected, turned on, and/or set to non-zero output volume;

Whether a microphone is connected, turned on, and set to non-zero input volume;

Whether speakers and/or a microphone are producing distortion (e.g., using self-test and/or audio feedback from the speakers to the microphone);

Whether the microphone circuitry is clipping;

Self-test results of electronics used in processing incoming and/or outgoing audio signals;

Parameters of digital signal processing applied to incoming and/or outgoing audio signals;

The sampling rate of an audio codec for encoding outgoing audio signals and/or for decoding incoming audio signals;

The type of audio codec used for encoding and/or decoding audio signals;

Upload and/or download network transmission speeds;

Whether and/or to what extent network packets are dropped in sending and/or receiving audio signals over the network 120;

Round-trip network delay to the conference server 130;

Round-trip network delay to each of the other computing devices 110.

The particular listed factors are intended to be illustrative rather than limiting. Detectors of the measurement circuitry 226 may be implemented using hardware, e.g., sensors, analog circuitry, digital circuitry, and/or processors, or by using software, firmware, or any combination of hardware, software, and firmware.

In some examples, the environment 100 includes a service provider, such as a conferencing server 130, which acts as an audio bridge and/or provides other communication services, such as video, text-based chat, file sharing, and the like. The conferencing server 130 is seen to include a set of processors 132 (e.g., one or more processing chips and/or assemblies), a set of network interfaces 134 (e.g., one or more network cards, chips, and/or assemblies), measurement circuitry 136, and memory 140. Measurement circuitry 136 is similar to measurement circuitry 226 but includes detectors for measuring factors from the point of view of the conferencing server 130, such as network speed, dropped packets, round-trip delays to each of the computing devices 110, and parameters of any codecs used for resampling audio.

The memory 140 may include both volatile memory, e.g., Random Access Memory (RAM), and non-volatile memory, such as one or more ROMs (Read-Only Memories), disk drives, solid state drives, and the like. The set of processors 132 and the memory 140 together form control circuitry, which is constructed and arranged to carry out various methods and functions as described herein. Also, the memory 140 includes a variety of software constructs realized in the form of executable instructions. These include raw collector 142, MOS assigner 144, MOS combiner 146, and remediator 150. When the executable instructions are run by the set of processors 132, the processors 132 are caused to carry out the operations of the software constructs. Although certain software constructs are specifically shown and described, it is understood that the memory 140 typically includes many other software constructs, which are not shown, such as an operating system, various applications, processes, and daemons.

In example operation, users 108 operate respective computing devices 110 to engage as parties in a communication session over the network 120. For example, each user 108 may operate the software program 260 on a respective computing device 110 to join a call or conference. The conferencing server 130 may establish the communication session and merge audio feeds from the computing devices 110, thus enabling each of the computing devices 110 to send audio to each of the other computing devices 110. Users 108 of the computing devices 110 can thus speak to one another and be heard.

Each of the computing devices 110 may manage two audio streams: one for incoming audio, to be routed to local speakers, and another for outgoing audio, to be sent to the other computing devices 110, e.g., via the conferencing server 130, over the network 120. In the course of processing each audio stream, detectors of measurement circuitry 136 in that audio stream generate measurements of respective audio factors. For example, an incoming detector may measure packet loss of an incoming audio signal, while an outgoing detector may measure a sampling rate employed by an audio codec that encodes audio originating from a local microphone. Each of the detectors may generate a raw value as a measurement, and the computing device 110 may send the raw values to the conferencing server 130 for collection and processing. For example, computing device 110(1) may send raw values 112(1) of outgoing audio, generated by detectors in the outgoing audio stream, and may also send raw values 114(1) of incoming audio, generated by detectors in the incoming audio stream. Computing device 110(2) may perform similar acts, generating raw values 112(2) for outgoing audio and raw values 114(2) for incoming audio.

The conferencing server 130 receives raw values 112 and 114 from the computing devices 110 and collects them in raw collector 142, which may also collect output from detectors in measurement circuitry 136. In some examples, raw collector 142 performs pre-processing on raw values 112 and 114. For example, raw collector 142 may combine raw values from detectors that measure audio factors which, when degraded, tend to produce a common perceptual effect in a listener. For example, if a high degree of packet loss tends to produce distorted audio that sounds the same to a typical user as audio distorted by clipping, then raw collector 142 may combine raw values from a detector for packet loss with raw values from a detector for clipping and represent both values as a single output. Other raw values may simply be passed through, unaltered and without being combined with other factors.

Raw values 142a from raw collector 142 pass to MOS assigner 144, which assigns a respective MOS (mean opinion score) value 144a to each of the raw values 142a. For example, a particular detector may produce a raw value 142a that varies between 0 and 1, and the MOS assigner 144 may assign the raw value 142a a corresponding MOS value 144a that varies between 1 and 5. Thus, for example, a raw value of 0.5 might produce a MOS value of 3, whereas a raw value of 0.7 might produce a MOS value of 4.

The relationship between raw scores 142a and MOS values 144a is not necessarily linear and is preferably established based on off-line testing. For example, human subjects may be exposed to audio signals having reference-level quality in all respects except for one test factor, which is measured by a particular detector (or group of combined detectors) and represented by one raw value 142a. The human subjects listen to audio samples in which the test factor is degraded by different levels, with all other audio factors held constant at reference levels, and assign opinion scores to the audio at each level of degradation. The opinion scores across all human subjects are averaged at each degradation level to produce a mean opinion score (MOS) for each level. When repeated across all levels of degradation of the test factor, a mapping is produced for the test factor between levels of the raw value 142a and corresponding MOS values 144a. Later, when performing real-time audio quality estimation, the MOS assigner 144 receives a raw value 142a for the test factor and applies the mapping to identify a corresponding MOS value 144a. The MOS assigner 144 may employ interpolation when levels of the raw value 144a fall between test levels used when generating the mapping. One should appreciate that the MOS assigner 144 may employ a look-up table, curve fitting, or any other suitable construct for converting raw scores 142a to corresponding MOS values 144a. Similar activities may be performed for all audio factors to produce respective mappings (one for each audio factor or group of combined audio factors), and the mappings may be applied in real time to generate respective MOS values 144a.

In another example, mappings between raw values 142a and corresponding MOS values 144a are established offline using VQT (Voice Quality Testing) software, such as POLQA (perceptual objective listening quality assessment), PESQ (Perceptual Evaluation of Speech Quality), or ViSQOL (Virtual Speech Quality Objective Listener). For example, a test system using VQT software receives a first input carrying a reference (non-degraded) audio signal and a second input carrying a test audio signal that is degraded for a particular audio factor but that has reference levels for all other audio factors. At each level of degradation of the audio factor, as represented by a respective raw value 142a, the test system produces a corresponding MOS value. Associations between raw values 142a and MOS values are arranged to produce a mapping. As before, the mapping may take the form of a look-up table, a fitted curve, or any other suitable construct that enables real-time conversions of raw values 142a to corresponding MOS values 144a.

One should appreciate that mappings between raw values 142a and MOS values 144a may be established using other approaches, such as MUSHRA (MUltiple Stimuli with Hidden Reference and Anchor), and may use approaches other than testing on human subjects or VQT. For example, a single human can assign mappings based on subjective impressions. Also, a computer program not running VQT software may assign mappings. Although not recommended, a standard mapping may be applied, such as the same mapping for all factors. The particular examples described are thus not intended to be limiting.

Once MOS assigner 144 has produced MOS values 144a across all audio factors (or any desired number of them), MOS combiner 146 combines the MOS values 144a to produce an overall measure of audio quality 148. The MOS combiner 146 may express overall audio quality as a MOS value, as a probability, or in any other suitable manner. In addition, MOS combiner 146 may combine MOS values 144a using any suitable technique, such as by computing averages of MOS values 144a, computing weighted averages, or by using a more advanced approach, such as the one described in a later portion of this document.

In some examples, MOS combiner 146 produces only a single measure of overall audio quality 148, which applies to all parties engaged in the communication session. In other examples, MOS combiner 146 produces multiple measures of overall audio quality 148, such as one measure for each party to the communication session. The overall quality measure 148 for each party may represent an estimate of the quality of audio rendered to that party, e.g., as played on speakers of that party's computing device 110. To this end, MOS combiner 146 may aggregate MOS values 144a on a per-party basis and may limit MOS values 144a used to compute measures of overall quality to those aggregated for the respective party.

For example, to produce an overall quality measure 148(1) for computing device 110(1), the MOS combiner 146 may aggregate MOS values 144a derived from raw values 114(1) (audio in for 110(1)) with MOS values 144a derived from raw values 112(2) (audio out for 110(2)). MOS combiner 146 may further include in the aggregation MOS values derived from detectors in measurement circuitry 136 in conferencing server 130, which are in the audio processing path to computing device 110(1). Likewise, to produce an overall quality measure 148(2) for computing device 110(2), the MOS combiner 146 may aggregate MOS values 144a derived from raw values 114(2) (audio in for 110(2)) with MOS values 144a derived from raw values 112(1) (audio out for 110(1)). MOS combiner 146 may further include in this aggregation MOS values derived from detectors in measurement circuitry 136 that are in the audio processing path to computing device 110(2). MOS combiner 146 may operate in similar ways for other parties (if any) to produce respective measures of audio quality for those parties.

Conferencing server 130 may then send the computed measure (or measures) of overall audio quality 148 over the network 120 to the computing devices 110. The software programs 260 running on the computing devices 110 receive the measure or measures of audio quality 148 and render them to the parties via respective displays. For example, a software program 260 running on computing device 110(2) renders measures of audio quality 148(1) and 148(2) on a local display (e.g., a touchscreen). The software program 260 may render measures of overall audio quality 148(1) and 148(2) in any suitable manner, such as by using graphical elements, text, and/or colors. Here, graphical elements depicting simulated gauges are shown. The software program 260 has rendered the gauges next to avatars 116(1) and 116(2) representing the users 108 of the computing devices 110 participating in the communication session. It can thus be seen that Matthieu's audio quality is good whereas Bjorn's is not quite as good. Perhaps Bjorn's audio is suffering from packet loss, a slow network connection, or a damaged speaker.

One should appreciate that there are myriad ways that the software program 260 may render measures of audio quality. For instance, bars may be used in place of gauges, with illuminated lengths of the bars reflecting the levels of audio quality. Colors may indicate audio quality, as well, with red, yellow, and green reflecting poor, fair, and good audio quality, respectively. The particular examples described are not intended to be limiting.

Referring back to the conferencing server 130, it is seen that remediator 150 is configured to receive values of overall audio quality 148 as well as MOS values 144a and to send messages 152 over the network 120 to computing devices 110 recommending remedial actions. For example, remediator 150 includes a knowledge base (not shown) that associates levels of MOS values 144a for particular audio factors with corresponding messages 152 that specify remedial actions that may be taken to raise those MOS values 144a. If overall audio quality 148 falls below a predetermined threshold, or if any MOS value does, remediator 150 may access the knowledge base, identify one or more corresponding messages 152, and send the messages to the affected computing device 110 or devices. In the case of FIG. 1, remediator 150 has determined that a MOS value 144a corresponding to network speed for computing device 110 (2) is low, and has sent a message 152 to computing device 110(2), directing the user to "Try switching networks." The user may then decide whether to follow the recommendation, e.g., by switching from a cell phone network to a local Wi-Fi network. Assuming the user does switch networks, a detector in measurement circuitry 136 of computing device 110 may measure the increased network speed and send an updated raw value for network speed to the conferencing server 130, which may proceed to compute a new overall audio quality value 148(2) and send the new value back to computing device 110(2), causing the gauge display for 148(2) to respond, in real time, to the improved audio condition, e.g., by rotating the displayed needle a few degrees clockwise.

In some examples, the knowledge base further associates the levels of MOS values 144a with corresponding instructions 154 to change one or more settings on an affected computing device 110, e.g., in order to raise MOS values 144a that are found to be low. For instance, instructions may specify a change to a volume setting, sampling rate, or selection of available networks. The remediator 150 may access the knowledge base, identify one or more instructions 154, and send the instructions 154 to the affected computing device 110. The software program 260 on the affected computing device 110 may receive the instructions 154 and implement them to improve its audio quality. The computing device 110 may implement the instructions 154 with or without user input or confirmation, e.g., the computing device 110 may update settings automatically or semi-automatically. As before, a change in settings causes a change in a detector measurement, which may result in a new value of overall quality, which will be reflected in real time in the gauge display for 148(2).

Providing separate indicators for audio quality on a per-party basis can offer direct benefits to the parties. Each party is able to see, on that party's local display, an estimate of audio quality received by each of the other parties. Each party can therefore tell whether any other party might be having trouble hearing, and can compensate by speaking up, getting closer to a microphone, hanging up and calling back in, and so forth. The need for explicit discussions about audio quality or any self-consciousness that may arise from such discussions is therefore reduced.

One should appreciate that estimates 148 of overall audio quality are updated in real time on a near-continuous basis from the human perspective, such that changes in audio quality can be quickly detected and managed while the communication session is ongoing. In some examples, the conferencing server 130 may update estimates of audio quality periodically, such as every second. To avoid rapid changes in settings, which might be distracting to users, moving averages or other filtering techniques may be applied.

Further, activities ascribed herein to the conferencing server 130 may alternatively be performed by the computing devices themselves. For example, each computing device 110, or any of them, may include its own raw combiner 142, MOS assigner 144, MOS combiner 146, and remediator 150, for generating a measure 148 of overall audio quality for itself and/or other parties, and for performing remediation.

Further still, detectors in measurement circuitry 136 and 226 may be distributed throughout the environment 100 in any sensible way. Thus, for example, some embodiments may provide detectors in computing devices 110 but not in the conferencing server 130, or in only some computing devices or in one computing device. Other embodiments may provide detectors only in conferencing server 130. Still other embodiments may provide detectors in other locations, such as in network components, e.g., routers, switches, etc., or in separate computers tasked with monitoring audio network traffic.

Figure 2:
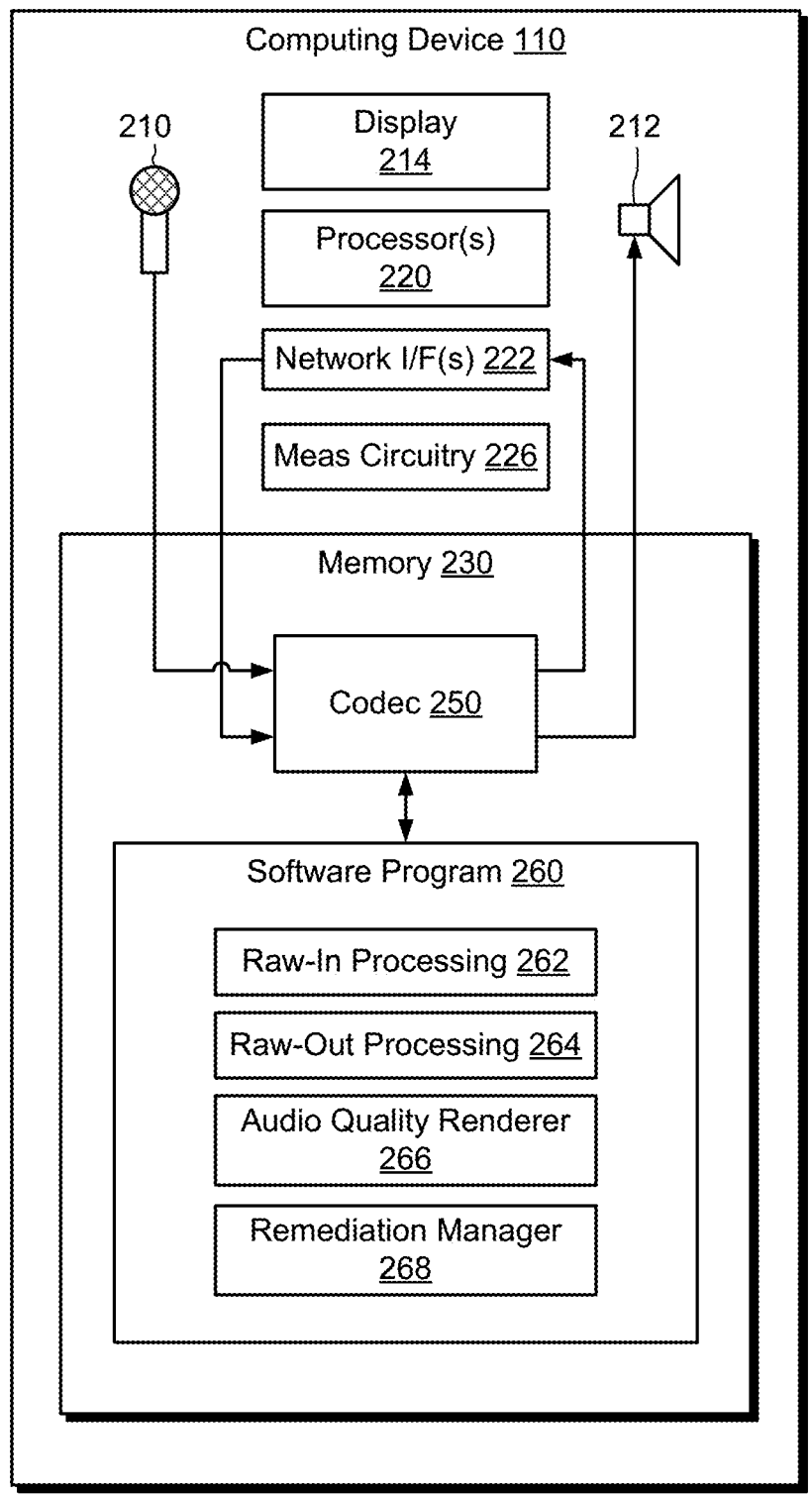
FIG. 2 is a block diagram of an example computing device of FIG. 1.

FIG. 2 shows an example arrangement of a computing device 110 in greater detail. The depiction in FIG. 2 is intended to be representative of computing devices 110, although it is recognized that different computing devices 110 may vary in their particular design and construction. Computing device 110 is seen to include a display 214, such as a touchscreen or flat panel display, a set of processors 220, such as one or more processing chips and/or assemblies, a set of network interfaces 222, such as one or more network interface cards, chips or assemblies, the above-described measurement circuitry 226, and memory 230. In some examples, computing device 110 further includes a microphone 210 and speakers 212. The microphone 210 and speakers 212 may be built-in or provided externally. In some examples, the microphone and speakers are parts of a headset, headphones, or ear buds. The microphone 210 may be part of a webcam or may be provided in any other suitable way.

The memory 230 is seen to "include," i.e., to realize by operation of software instructions and data, a codec (encoder/decoder) 250 and the above-described software program 260. The codec 250 encodes and compresses audio received from the microphone 210, e.g., in preparation for outgoing transmission over the network 120. The codec 250 also decompresses and decodes incoming audio, e.g., audio signals received over the network 120 from other computing devices 110 and/or from the conferencing server 130. In some examples, the codec 250 supports both audio and video. The software program 260 includes raw-in processing 262, raw-out processing 264, audio quality renderer 266, and remediation manager 268. The memory 230 may include both volatile and non-volatile memory.

Raw-in processing 262 includes software components that work in connection with hardware and/or firmware of detectors in the measurement circuitry 226, to assist in measuring and/or detecting audio factors that pertain to incoming audio signals, i.e., signals to be played on speakers 212. Raw-out processing 264 performs a similar role for detectors monitoring audio factors of outgoing audio signals, which include signals from the microphone 210. Audio quality renderer 266 receives estimates 148 of overall audio quality and renders them on display 214, e.g., as simulated gauges, bars, colors, and/or text, for example. Remediation manager 268 receives messages 152 and/or remedial actions 154, rendering the messages 152 on display 214 and implementing the remedial actions 154. For example, implementing a remedial action 154 might involve directing the set of network interfaces 222 to connect to a different network, directing the codec 250 to change its sampling rate, or directing an amplifier connected to the microphone 210 to increase its gain.

Figure 3:
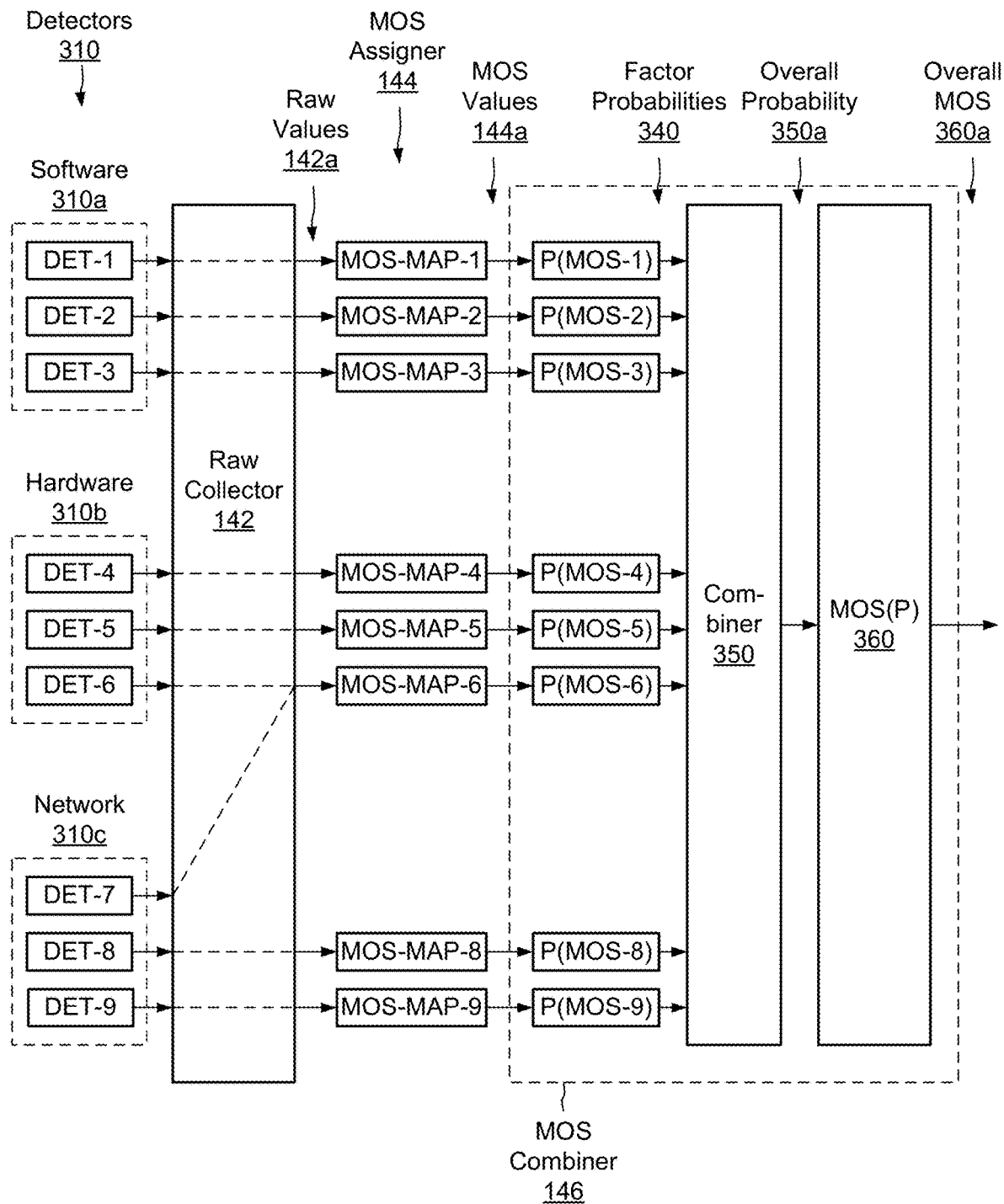
FIG. 3 is a block diagram of an example flow of operations for measuring audio quality.

FIG. 3 shows an example arrangement for measuring audio factors and processing them to produce overall estimates of audio quality. Here, detectors 310 of audio factors include software detectors 310a (DET-1, DET-2, and DET-3), hardware detectors 310b (DET-4, DET-5, and DET-6), and network detectors 310c (DET-7, DET-8, and DET-9), which measure audio factors that result from operation of hardware, software, and network components, respectively. Even though they are shown together, the detectors 310 may be physically distributed in any suitable way across the environment 100. It is assumed for this example that the detectors 310 have already been grouped for purposes of generating a desired measure of audio quality. For example, the detectors 310 may all relate to audio quality as rendered on computing device 110(1).

Raw collector 142 (FIG. 1) receives outputs from detectors 310. As shown by dashed lines, outputs of some detectors pass directly through raw collector 142 while outputs of other detectors are combined. Outputs of detectors may be combined when the detectors measure audio characteristics for which poor quality tends to produce a common perceptual effect. Here, outputs of detectors DET-6 and DET-7 combine to produce a single output value. Combining outputs of detectors may involve taking averages of detector values or assigning the output value to be the smallest detector value. For example, if DET-6 produces a raw value of 0.8 and DET-7 produces a raw value of 0.6 (each on a scale of 0-1), the raw collector 142 may assign the output value a score of 0.6. A rationale behind taking a minimum of sub-factor values to produce the output is that a low score in any of the sub-factors will produce the undesired perceptual effect, even if the other sub-factor values are high.

MOS assigner 144 receives raw values 142a from raw collector 142 and processes the respective raw values 142a via respective paths to produce respective MOS values 144a. Each MOS value 144a is produced from output from a respective detector 310 (or group of combined detectors) and is independent of other detectors. For example, MOS-Map-1 receives the output of DET-1 and produces a MOS value 144a for DET-1, which is independent of output from other detectors. Similar operations apply to MOS-Map-2 through MOS-Map-5. For MOS-Map-6, a MOS value 144a is assigned to the combined output of detectors DET-6 and DET-7. Assignments of MOS values 144a may employ mappings generated based on offline testing, as described in connection with FIG. 1.

Each of the MOS values 144a then proceeds to MOS combiner 146. Here, probability estimators P(MOS-1) through P(MOS-6), P(MOS-8), and P(MOS-9) separately transform each MOS value 144a into a respective factor probability 340, where each factor probability 340 represents a probability of bad audio being produced on account of the respective audio factor alone. For example, the factor probability 340 produced by P(MOS-1) is the probability that audio will be bad on account of the particular audio factor as measured by DET-1. Likewise, the factor probability 340 produced by P(MOS-2) is the probability that audio will be bad on account of the particular audio factor as measured by DET-2. In the usual manner, each of the factor probabilities 340 may range from 0 to 1.

Once all factor probabilities 340 have been generated, combiner 350 combines the factor probabilities 340 to produce a single value of overall probability 350a, which represents the overall probability of bad audio taking all audio factors as measured by detectors 310 into account. Combiner 350 may combine factor probabilities 340 in any mathematically sound manner, with a specific example provided further below.

In some examples, once the overall probability 350a has been generated, MOS converter 360 converts the overall probability 350a to an overall MOS value 360a. The MOS combiner 146 may then provide the overall MOS value 360a as the overall measure of audio quality 148.

Thus, the processing of detector outputs involves expressing each audio factor as a MOS value 144a, converting each MOS value 144a to a respective factor probability 340, combining the factor probabilities 340 to produce an overall probability 350a, and expressing the overall probability 350a as an overall MOS value 360a. Example statistical methods for converting MOS values 144a to factor probabilities 340 and for converting the overall probability 350a to the overall MOS value 360a will now be described with reference to FIGS. 4-9.

Figure 4:
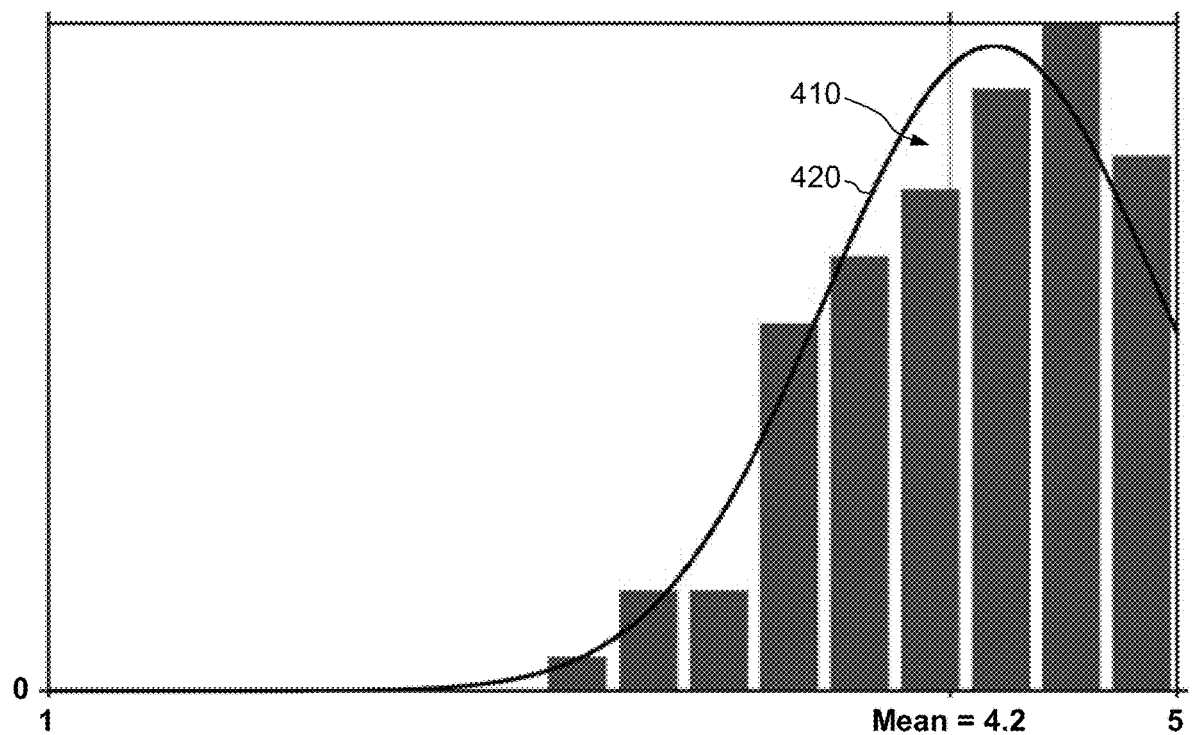
FIG. 4 is a graph showing an example reference distribution of discrete quality values for a reference audio signal and an approximation of the same reference distribution using a truncated Gaussian function.

FIG. 4 shows an example reference distribution (bar graph 410) of discrete quality values which may be assigned by human subjects to a reference audio signal. FIG. 4 also shows an approximation 420 of the same reference distribution using a truncated Gaussian function.

Bar graph 410 may be obtained, for example, by playing a reference audio signal (having no degradation) to a group of human listeners and soliciting their subjective evaluations of quality on a scale of 1 to 5. The bar graph 410 relates opinion scores on the horizontal axis to frequencies of those opinion scores on the vertical axis. Owing to the natural variability of subjective impressions, listener scores will fall into a distribution, despite all listeners hearing the same, high-quality audio. The mean score in this case is 4.2 and directly provides a mean opinion score (MOS value) of the reference audio signal.

The truncated Gaussian distribution 420 is constructed as an approximation of the bar graph 410 by distribution-fitting techniques known to those skilled in the art. Other curve shapes besides truncated Gaussians may be used, e.g., if other curve shapes provide better fits to the shapes of the distributions.

Figure 5A:
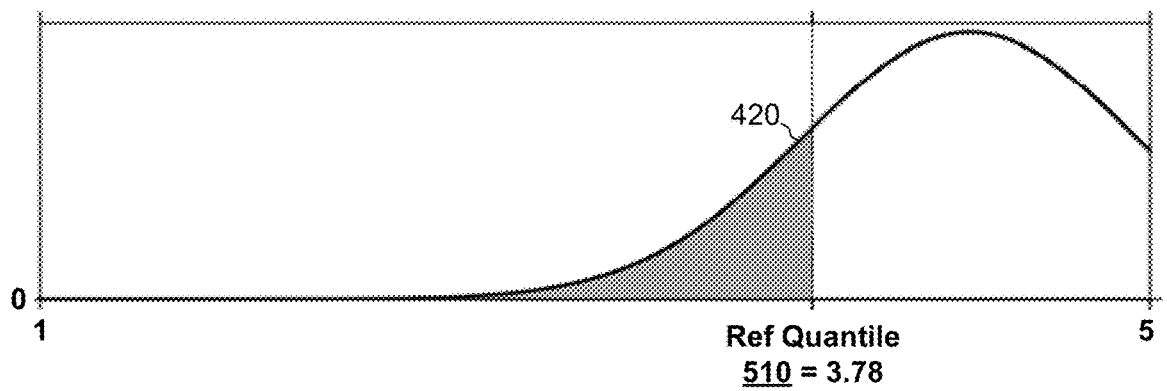
FIGS. 5A and 5B are graphs respectively showing (A) the approximated reference distribution from FIG. 4 and (B) a CDF (cumulative distribution function) of the reference distribution shown in FIG. 5A.
Figure 5B:
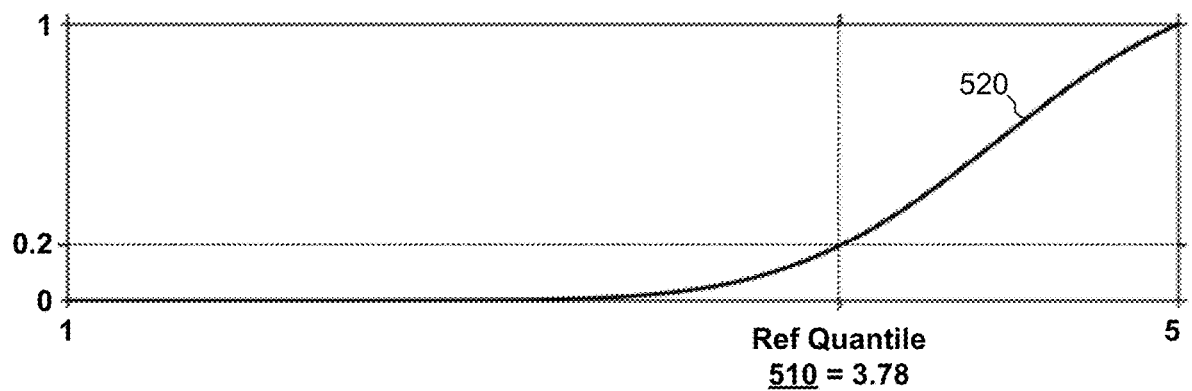

FIG. 5A shows the same truncated Gaussian approximation 420 as in FIG. 4, and FIG. 5B shows a CDF (cumulative distribution function) 520 of the truncated Gaussian 420, i.e., the integral of distribution 420. In the example shown, we define a "reference quantile" 510 as a standard for distinguishing "good audio" from "bad audio." For example, we assign any score above the reference quantile 510 as good audio and any score below the reference quantile as bad audio. The reference quantile 510 may represent any percentile value of the distribution 520. In the example shown, we define the reference quantile 510 as the 20$^{th}$ percentile of the distribution 420, which corresponds here to a score of 3.78. According to this scheme, MOS values above 3.78 are good audio and scores below 3.78 are bad audio.

Figure 6A:
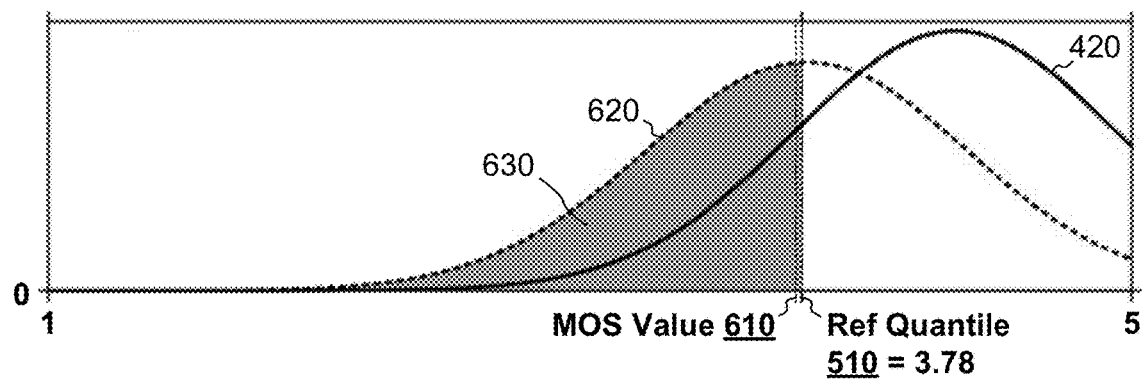
FIGS. 6A and 6B are graphs respectively showing (A) a comparison between the reference distribution (solid) of FIG. 5A and a factor distribution (dashed) for a first audio factor and (B) a CDF of the factor distribution of the first audio factor.

FIG. 6A shows a MOS value 610 for a particular audio factor superimposed over the same distribution 420 as in FIGS. 4 and 5A. For example, MOS value 610 represents a MOS value 144a produced by the MOS assigner 144 in response to a particular raw value 142a, which corresponds to a somewhat degraded audio factor. As explained previously, MOS assigner 144 may assign this MOS value by mapping a raw value to a MOS value, where the mapping is established based on prior, offline characterization.

Using this MOS value 610, MOS combiner 146 may convert the MOS value 610 to a factor probability 340, i.e., a probability of bad audio for the particular factor alone, as follows. First, MOS combiner 146 constructs a distribution 620 around MOS value 610, e.g., by assuming a truncated Gaussian curve shape whose mean is MOS value 610 and whose standard deviation is provided based on prior characterization. For example, if prior characterization of MOS values based on raw scores was conducted using human subjects, then a suitable standard deviation may be obtained based on standard deviations seen in the human test data. Alternatively, a standard deviation may simply be assumed, e.g., based on what is normally seen in human opinion scores. In some examples, a larger standard deviation may be assumed when the MOS value 610 is lower and a smaller standard deviation may be assumed when the MOS value 610 is larger, to reflect the observation that lower MOS scores are often associated with larger ranges of opinion scores.

Second, once the distribution 620 is established, MOS combiner 146 may compute an integral of the constructed distribution 620 from 1 up to the reference quantile (3.78 in the example shown). This integral is represented by the shaded area 630 under the constructed distribution 620.

Figure 6B:
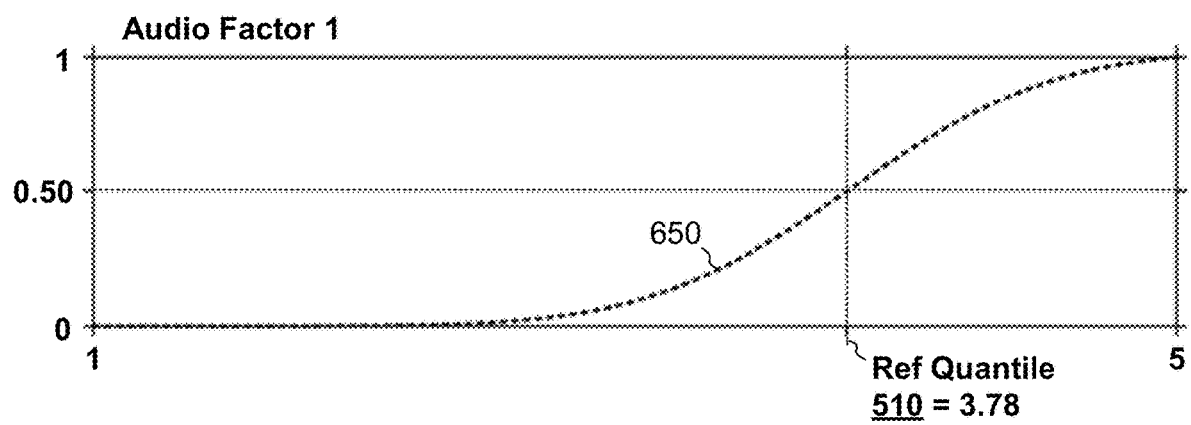

FIG. 6B shows the CDF 650 of the constructed distribution 620 and allows the desired integral to be read directly, i.e., as the CDF value that corresponds to the reference quantile. The CDF value in this case is 0.50. Given the conventions established above, the factor probability 340 for the particular audio factor represented by MOS value 610 is thus 0.50, which may also be regarded as the probability of bad audio arising from the particular audio factor alone.

Figure 7:
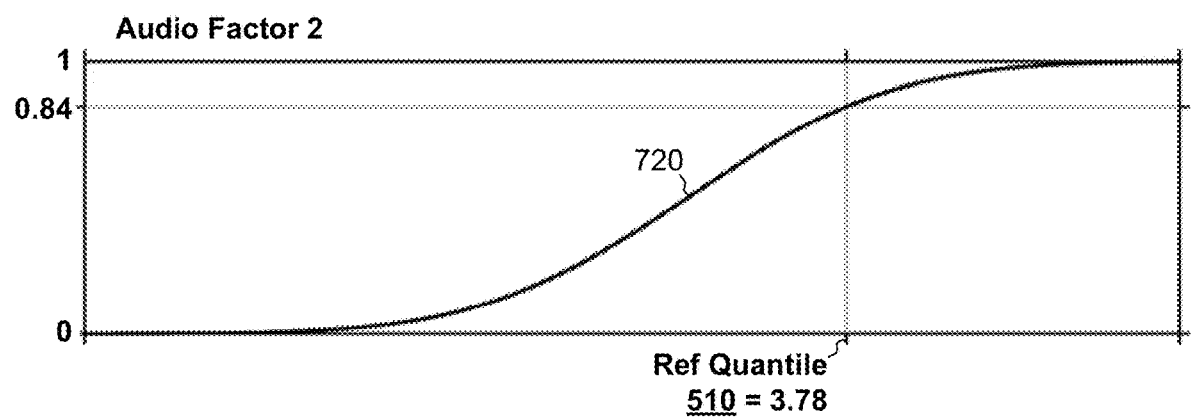
FIG. 7 is a graph showing a CDF of a factor distribution of a second audio factor.

MOS combiner 146 may use the technique described above to convert each of the MOS values 144a to a corresponding factor probability 340. For example, FIG. 7 shows a factor probability 340 of 0.84 for a second audio factor, e.g., as read from CDF curve 720 for the second audio factor.

In some examples, the technique normalizes factor probabilities 340 such that the reference quantile 510 always maps to 0.5. The interpretation is that if you have a CDF value located at the split between good audio and bad audio, you are in a 50/50 position to select either one of them, thus giving a factor probability of 0.5. To map CDF to a factor probability, we may apply any function that maps the range [0, 1] onto itself (with 0 mapping to 0 and 1 mapping to 1) but maps the reference quantile 510 onto 0.5. For example, the function would map our reference quantile of 0.2 to 0.5. An example mapping of this kind is the Möbius transform, which may be expressed as follows:

$$d_i = \frac{(1-q)p_i}{q+(1-2q)p_i},\quad\quad\text{(EQ. 1)}$$

where q is the quantile (0.2 in this example), $p_i$ is the factor probability (0.50 for the first audio factor or 0.84 for the second audio factor), and $d_i$ is the remapped factor probability. Here, $d_i$ is 0.8 for the first audio factor (FIG. 6B) and 0.95 for the second audio factor (FIG. 7). Note that $d_i$ simply becomes $p_i$ when q is 0.5, i.e., when the reference quantile 510 is the median of the reference distribution 420.

Once all MOS values 144a have been expressed as corresponding factor probabilities 340 and mapped using the Möbius transform as above, combiner 350 may combine the mapped factor probabilities to produce an uncorrected overall probability. For example, combiner 350 may take the product of all mapped factor probabilities $d_i$ and divide that product by the sum of (1) the product of all mapped factor probabilities and (2) the product of complements of all mapped factor probabilities. This operation may be expressed by the following equation:

$$P_Y = \frac{\prod_{i=1}^{N} d_i}{\prod_{i=1}^{N} d_i + \prod_{i=1}^{N}(1-d_i)}\quad\quad\text{(EQ. 2)}$$

where $P_Y$ is the uncorrected overall probability, N is the total number of factor probabilities 340, $d_i$ is the i-th mapped factor probability, and $(1-d_i)$ is the complement of the i-th mapped factor probability.

The combiner 350 may then operate an inverse Möbius transform to generate corrected overall probability 350a. For example, combiner 350 may calculate corrected overall probability 350a as follows:

$$P = \frac{qP_Y}{1 - q - (1 - 2q)P_Y}. \quad (EQ. 3)$$

Note that P equals $P_Y$ when the reference quantile 510 is selected to be the median, i.e., when q=0.5.

In some examples, MOS combiner 146 may use the overall probability 350a as a measure of overall audio quality 148 and take no action to convert the overall probability 350a to a MOS value. Conversion to a MOS value is preferred, however, as MOS values provide a more recognizable standard for representing audio quality.

Figure 8A:
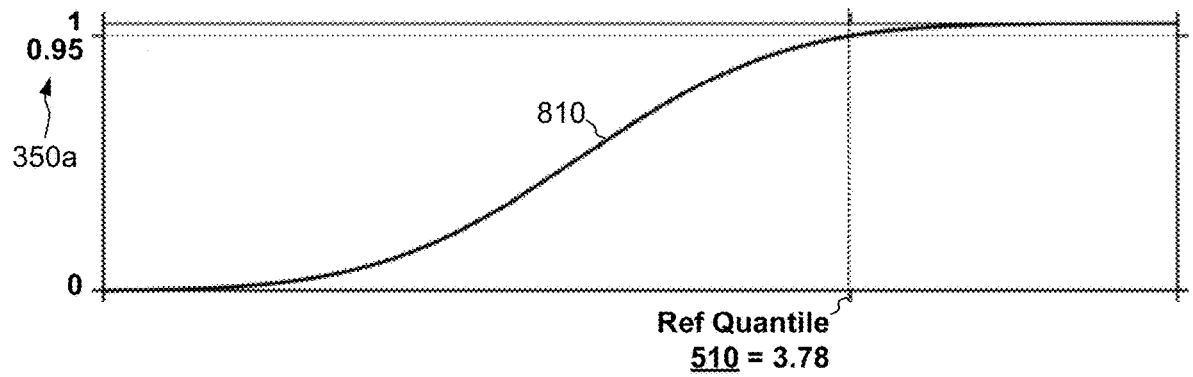
FIGS. 8A and 8B are graphs respectively showing (A) a constructed CDF that provides an overall probability of bad audio at a reference quantile of the reference distribution and (B) a constructed Gaussian function underlying the CDF of FIG. 8A.
Figure 8B:
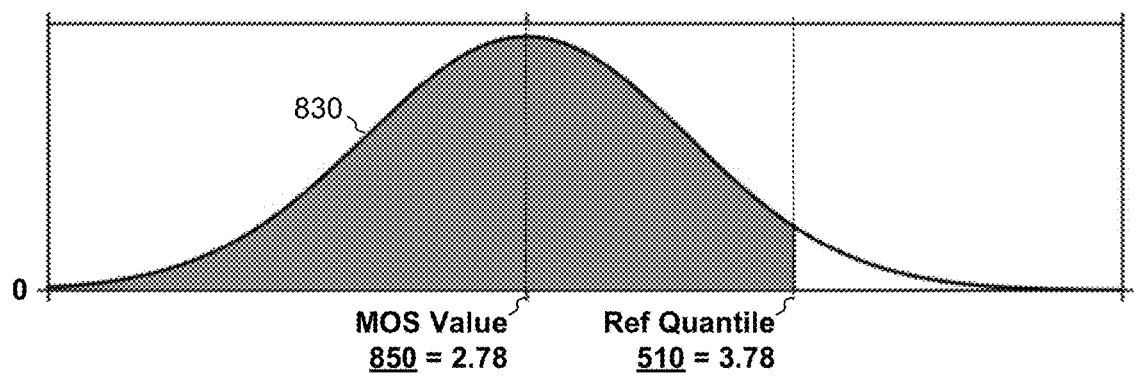

FIGS. 8A and 8B show an example arrangement for converting the overall probability 350a to the overall MOS value 360a. In the example shown, after combining all factor probabilities 340 and correcting the result, combiner 350 has computed the overall probability 350a to be 0.95. The task now is to construct a new distribution 830 whose CDF 810 maps the overall probability 350a to the reference quantile 510 (3.78 in the example shown).

FIG. 8A shows an example CDF 810 that meets the requirements. The shape of the CDF 810 may be assumed the same way as before, e.g., as a truncated Gaussian distribution having a known standard deviation but an unknown mean. In an example, the well-known Newton Raphson method may be used to identify the mean. For example, a trial mean is selected and an integral of the distribution is evaluated at the reference quantile, which is a known point (here, 3.78, 0.95). If the integral matches the overall probability 350a to within acceptable limits, then the mean of the distribution is considered to have been found. Otherwise, a new mean is selected, the integral is repeated on the distribution with the new mean, and the overall probability is evaluated again. The process is repeated for different values of the mean until the computed probability matches the overall probability 350a to within the acceptable limits. Once the MOS Combiner 146 has established the CDF 810, it may generate distribution 830 (FIG. 8B) as the derivative of CDF 810. As distribution 830 represents a constructed distribution of opinion scores, the mean 850 of distribution 830 provides a mean opinion score (MOS 2.78), which provides the desired overall MOS value 360a. MOS combiner 146 may then use the overall MOS value 360a as the overall measure of audio quality 148.

Figure 9:
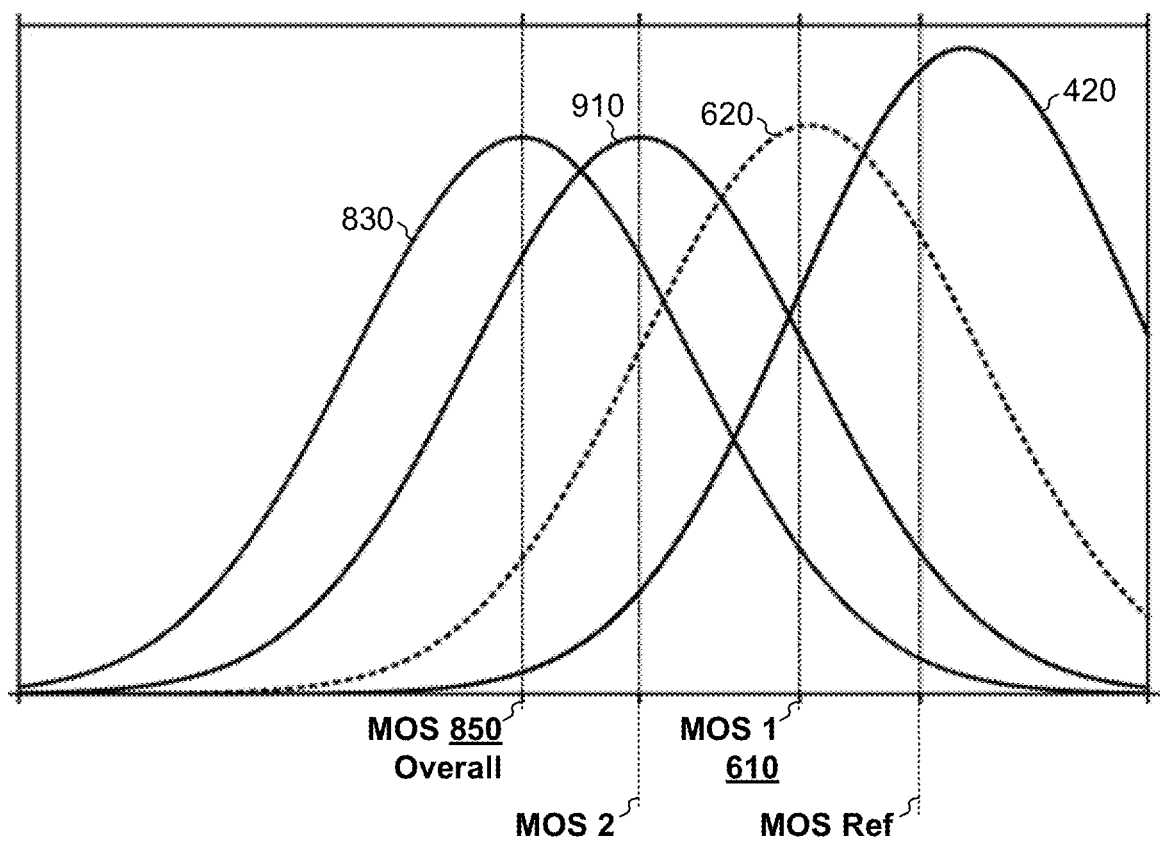
FIG. 9 is a graph showing multiple distributions as described in connection with FIGS. 4 through 8B.

FIG. 9 shows the distributions and associated MOS values as described in the foregoing example. Here, the reference distribution 420 has a MOS value "MOS Ref" of 4.2 (FIG. 4). The distribution 620 of the first audio factor has a MOS value 610 of approximately 3.78 (FIG. 6A), and a distribution 910 of the second audio factor (FIG. 7) has a MOS value of "MOS 2." The overall distribution 830 has a MOS value 360a of 2.78 (FIG. 8B). The example shows that the overall MOS value 360a is slightly lower than the MOS values for the first and second audio factors but that the effects of distortion are not directly additive. Rather, the particular manner of combining factor probabilities, as described in EQs. 1-3, takes into account the fact that audio distortions do not combine additively when perceived by human subjects.

Figure 10:
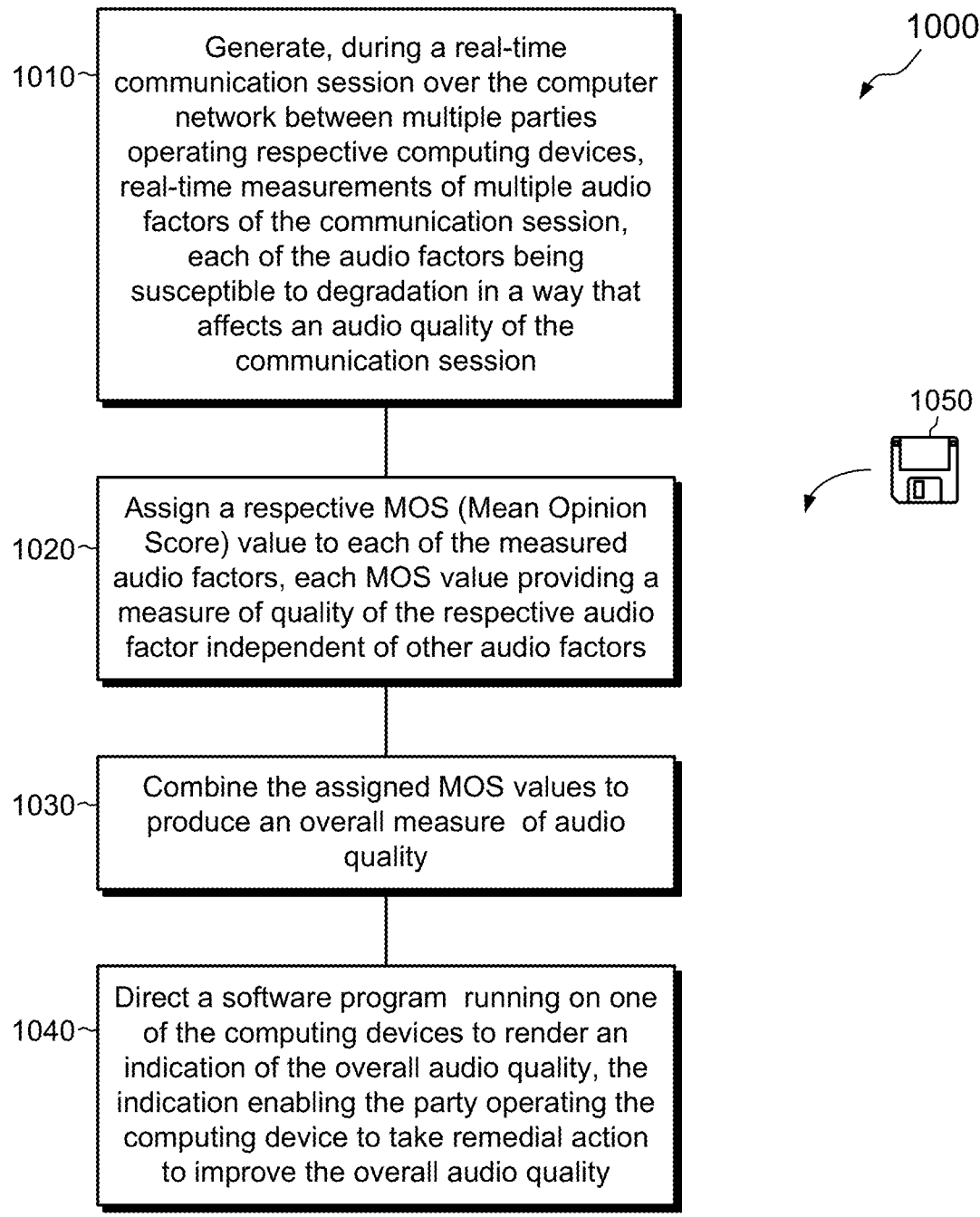
FIG. 10 is a flowchart showing an example method of estimating audio quality in real-time communications over a computer network.

FIG. 10 shows an example method 1000 that may be carried out in connection with the environment 100. The method 1000 is typically performed, for example, by the software constructs described in connection with FIG. 1, which reside in the memory 140 of the conferencing server 130 and are run by the set of processors 132. The various acts of method 800 may be ordered in any suitable way. Accordingly, embodiments may be constructed in which acts are performed in orders different from that illustrated, which may include performing some acts simultaneously.

At 1010, during a real-time communication session over a computer network 120 between multiple parties 108 operating respective computing devices 110, real-time measurements 142a are generated of multiple audio factors of the communication session. Each of the audio factors is susceptible to degradation in a way that affects an audio quality of the communication session.

At 1020, a respective MOS (Mean Opinion Score) value 144a is assigned to each of the measured audio factors. Each MOS value 144a provides a measure of quality of the respective audio factor independent of other audio factors. MOS values 144a may be assigned, for example, by applying mappings based on data collected offline.

At 1030, the assigned MOS values 144a are combined to produce an overall measure of audio quality, such as an overall probability 350a of bad audio and/or an overall MOS value 360a. For example, the methodology described in connection with FIGS. 4-7 may be applied to transform MOS values 144a to respective factor probabilities 340, to combine the factor probabilities 340 to arrive at an overall probability 350a of bad audio, and to transform the overall probability 350a of bad audio into an overall MOS score 360a.

At 1040, a software program 260 running on one of the computing devices 110 is directed to render an indication 148 of the overall audio quality, the indication enabling the party 108 operating the computing device 110 to take remedial action to improve the overall audio quality.

A technique has been described for estimating and enhancing audio quality in a real-time communication session between parties over a computer network. The technique produces real-time measurements of factors that are known to impact audio quality, assigns a separate MOS value to each of the measured factors, and combines the MOS values for the various factors to produce an overall measure of audio quality. At least one party to the real-time communication session operates a computing device that runs a software program, and the technique further includes directing the software program to render an indication of the overall audio quality, thereby enabling the party operating the computing device to take remedial action to improve the audio quality.

Section II: Optimizing Jitter Buffer Length

This section describes an improved technique for automatically varying a setting to improve audio quality of playback during a communication session. The technique includes generating, during a communication session between at least a first computing device and a second computing device over a computer network, multiple audio factors of the communication session, each of the audio factors being susceptible to degradation in a way that affects audio quality of the communication session. The technique combines the audio factors to produce an overall measure of audio quality and takes remedial action to improve the quality by adjusting a setting on the first computing device.

In an example, the adjusted setting is the length of a jitter buffer in the computing device. The jitter buffer is configured to receive, over a network, incoming audio data for playback during a communication session, such as an audio conference, web conference, telephone call, or the like, and to temporarily hold the audio data pending decoding of the data for playback. In this arrangement, increasing the length of the jitter buffer imposes additional latency in audio playback, but it also provides more time for delayed and/or retransmitted packets to arrive. The jitter buffer length that results in optimal communication quality may thus depend on multiple factors, such as latency and packet loss, and such factors may be at odds. To optimize communication quality overall, certain embodiments generate a set of factors related to the jitter buffer length and apply such factors in assessing playback quality. Multiple factors may be combined, e.g., in the manner described in Section I for combining MOS (Mean Opinion Score) values, and a jitter buffer length may be selected as one that maximizes audio playback quality overall. Although the technique described in this section can beneficially leverage that of Section I, the instant technique does not rely upon or require the particular embodiments of Section I and may be regarded as independent.

Figure 11:
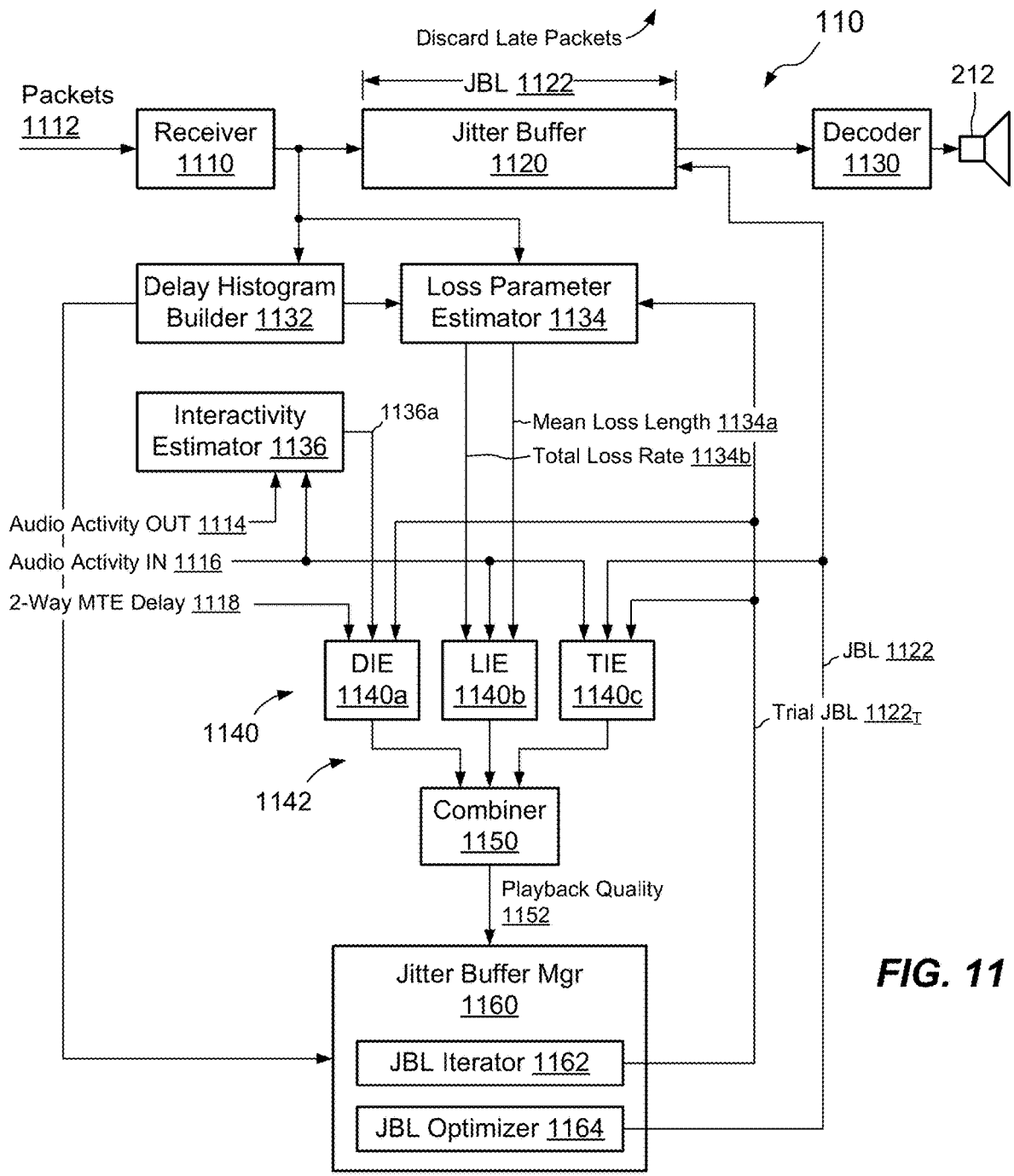
FIG. 11 is a block diagram showing an example apparatus for managing a jitter buffer in a computing device.

FIG. 11 shows example components of a computing device 110 with which embodiments of the improved technique can be practiced. Here, computing device 110 is one of computing devices 110(1) or 110(2) of FIG. 1 and may be configured in the manner described in connection with FIG. 2. As shown in FIG. 11, computing device 110 includes a receiver 1110, such as the network interface 222 (FIG. 2), as well as a jitter buffer 1120, a decoder 1130, and speaker(s) 212 (FIG. 2). The jitter buffer 1120 and the decoder 1130 are run in memory 230 of the computing device 110 (FIG. 2) and may be operable by execution of software instructions by processor(s) 220. The decoder 1130 may be part of the codec 250 of FIG. 2, for example.

Also residing in the memory 230 are delay histogram builder 1132, loss parameter estimator 1134, and interactivity estimator 1136. The delay histogram builder 1132 is configured to monitor arrival times of packets that convey audio data and to construct histograms that represent actual versus expected arrival times. The resulting histograms thus track and organize delays in arriving audio packets. As described more fully below, the loss impairment estimator 1134 is configured to estimate packet mean-loss length 1134a and network loss rate 1134b as functions of jitter buffer length.

The interactivity estimator 1136 is configured to generate a measure 1136a of interactivity between the computing device 110 and a second computing device that participates in a communication session with the computing device 110. The interactivity measure 1136a may be based on audio activity OUT 1114, i.e., an amount of speech or other audio content send out by the computing machine 110, e.g., in response to speech from a user of the computing device 110, and audio activity IN 1116, i.e., an amount of speech or other audio content received by the computing machine 110 from the second computing device, e.g., in response to speech from one or more other users. These activity measures may be generated locally or obtained from other constructs, such as a transport layer (not shown). The interactivity measure 1136a may be based on additional factors, as well, such as a mute state of the computing device 110. In some examples, the interactivity estimator 1136 generates a SAR (speaker alteration rate) value from its inputs, with SAR contributing to the interactivity measure 1136a.

The memory 230 further includes audio impairment estimators 1140. The audio impairment estimators 1140 are configured to estimate various audio impairments and may include, for example, a delay impairment estimator (DIE) 1140a, a loss impairment estimator (LIE) 1140b, and a time-scaling impairment estimator (TIE) 1140c. Each of the audio impairment estimators 1140 is configured to receive respective input and to produce respective output, which may take the form of a MOS value or some other measure of audio quality.

The memory 230 still further includes a combiner 1150 and a jitter buffer manager 1160. Combiner 1150 is configured to combine MOS values (or other measures of audio quality) to produce a value of overall playback quality 1152. The jitter buffer manager 1160 is configured to receive the overall playback quality 1152 and to perform various acts for establishing an optimal length 1122 of the jitter buffer 1120. To this end, the jitter buffer manager 1160 may include a jitter buffer length (JBL) iterator 1162 and a JBL optimizer 1164. As will be described, the JBL iterator 1162 simulates multiple trial JBL values $1122_T$, with a new value of overall playback quality 1152 produced for each trial JBL value. In an example, the multiple trial JBL values $1122_T$ are based on delay values present in a histogram produced by the delay histogram builder 1132. The JBL optimizer 1164 selects the trial JBL value $1122_T$ that yields the maximum playback quality 1152, and sets the actual jitter buffer length 1122 to the selected trial JBL value $1122_T$.

The DIE (Delay Impairment Estimator) 1140a is configured to estimate audio quality based on delay (latency) in playback. For example, DIE 1140a may produce higher scores for lower delays and lower scores for higher delays. The scores may vary based on the nature of the communication session. For example, delays may be more consequential during highly interactive sessions, when participants may frequently interrupt one another, than they are for webinars or other less interactive sessions. To this end, the DIE 1140a may be configured to receive as inputs interactivity measure 1136a and a two-way mouth-to-ear (MTE) delay 1118, e.g., a sum of (i) delay from a first participant's mouth to a second participant's ear and (ii) delay from the second participant's mouth back to the first participant's ear. The DIE 1140a may further receive the trial JBL $1122_T$.

The LIE (Loss Impairment Estimator) 1140b is configured to estimate audio quality based on packet loss. For example, audio quality is known to degrade in the presence of lost packets, and quality becomes worse when many packets are lost in a row and/or packets are lost at a high frequency. The term "lost packets" as used herein may relate to both dropped packets (i.e., network or "on-the-wire" losses) and/or too late-arriving packets. The LIE 1140b receives mean-loss length 1134a and network loss rate 1134b from loss parameter estimator 1134 and assigns a quality score accordingly. The loss parameter estimator 1134 estimates mean-loss length 1134a by monitoring incoming packets 1112 from receiver 1110 and measuring the mean length of gaps within a timing window set to the current trial JBL $1122_T$. The loss parameter estimator 1134 estimates network loss rate 1134b by examining a histogram (or CDF) of packet delays (from the delay histogram builder 1132) and calculating a percentage of audio samples that arrived after the current trial JBL $1122_T$. The network loss rate 1134b thus measures the percent of audio samples that would be missing from the jitter buffer 1120 for the current trial JBL $1122_T$. In some examples, the LIE 1140b also receives audio activity IN 1116 and may vary quality scores based thereon (e.g., dropped packets are irrelevant to quality if there is no audio input). In some examples, the transport layer tracks missing packets and generates statistics relating thereto. In such cases, the LIE 1140b may use these statistics instead of or in addition to relying upon input from the loss parameter estimator 1134. Although the loss parameter estimator 1134 is shown separately from the LIE 1140*b*, one should appreciate that it may be regarded as part of the LIE 1140*b*.

The TIE (Time-scaling Impairment Estimator) 1140*c* is configured to estimate audio quality based on time scaling. As is known, time scaling is a process whereby audio playback is sped up or slowed down in an effort to synchronize a person listening with a person speaking. For example, audio may be sped up after a momentary loss of network connectivity, e.g., to catch up the listener without skipping content. We have observed that time scaling itself is a factor in audio playback quality, as users may find changing the pace of audio playback to be distracting. Each change in JBL 1122 will result in an occurrence of time scaling, as playback must slow down (for increasing JBL) or speed up (for decreasing JBL). To properly assess quality based on time scaling, the TIE 1140*c* preferably receives inputs that specify a change in JBL, such as a current JBL 1122 and a target JBL, which is normally the trial JBL 1122$_T$. In some examples, the TIE 1140*c* further receives a specified time interval over which to complete the required time scaling. The TIE 1140*c* then produces an output that indicates audio quality (e.g., a MOS value) based on the time scaling needed to go from the current JBL to the target (or trial) JBL. In some examples, the TIE 1140*c* also receives audio activity IN 1116 and may vary quality scores based thereon. For example, time scaling does not impair audio quality when the incoming audio is silent.

Figure 12:
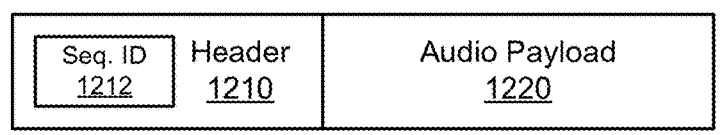
FIG. 12 is a block diagram showing an example packet that conveys audio information.

In example operation, computing device 110 participates in a communication session with one or more other computing devices, such as a second computing device. When a user of the second computing device speaks into a microphone, the second computing device converts that user's voice into audio data and transmits the audio data to computing device 110 over a network (e.g., network 120 of FIG. 1). The computing device 110 receives the audio data into receiver 1110 in discrete packets 1112 (e.g., Ethernet packets) and passes the packets 1112 to the jitter buffer 1120. Each packet may include a set of audio samples (e.g., one or more samples), which may be acquired at a known sampling rate, such as 44.1 kHz or some other suitable rate. The jitter buffer 1120 accumulates audio samples from packets 1112 and attempts to arrange the audio samples in their original sequence. As shown in FIG. 12, each packet 1112 may include a header 1210 and an audio payload 1220. The header 1210 may include a sequence identifier 1212, such as a timestamp or other label, which indicates a relative time or sequence of generation of the packet 1112. By ordering packets 1112 in the jitter buffer 1120 based on sequence identifier 1212, the jitter buffer 1120 is able to order the audio samples according to their order of acquisition and thus places the samples in the order needed for intelligible playback.

Although not required, the communication session may employ a transport protocol designed to always retransmit dropped packets. Thus, for example, any packet that is lost in transmission may be sent again as many times as needed until it arrives at its destination. While this protocol may guarantee that packets arrive eventually, it does not guarantee that packets arrive in order. Thus, a packet that gets dropped during a first transmission attempt may arrive at computing device 110 much later than other packets originally sent at around the same time. In such cases, jitter buffer 1120 inserts the late-arriving packets 1112 at the proper points in the sequence (based on sequence identifiers), provided that the jitter buffer 1120 has not already played out the portions of audio to which the late packets belong. If a packet 1112 arrives too late for playback, the computing device 110 may simply discard the packet. Any gap in the jitter buffer 1120 left by the missing packet may be filled mathematically by the decoder 1130 or other component during playback, e.g., using known interpolation and/or other content-filling techniques.

Dropped packets often have a direct effect on audio quality. If dropped packets were the only concern, the jitter buffer manager 1160 would set the JBL 1122 to a very large value, to allow ample time for packets to be retransmitted and to arrive prior to playback. Indeed, such long JBL values might work fine for webinars or other minimally or non-interactive communications, but they should preferably be balanced against the need for low latency in more interactive contexts, such as web conferences.

As the communication session proceeds, the jitter buffer 1120 fills and forms a pipeline of audio samples arranged based on the order in which they are acquired. Once the jitter buffer 1120 fills to the current JBL 1122, the jitter buffer 1120 begins playing out the buffered audio data to the decoder 1130, which converts the audio samples to an audio signal. The computing device 110 amplifies the audio signal and drives the speaker(s) 212 therewith, allowing a user of computing device 110 to hear the reconstructed sound.

In an example, the audio samples that arrive in packets 1112 have a predetermined sampling rate, $F_S$, which corresponds to a sample interval, $1/F_S$. Given this arrangement, the length 1122 of the jitter buffer 1120 corresponds to a particular number of audio samples, which implies a time delay through the jitter buffer 1120 equal to that number of audio samples times the sampling interval. In this fashion, the length 1122 of the jitter buffer 1120 directly corresponds to an additional delay in audio playback.

In some examples, as operation proceeds, the delay histogram builder 1132 constructs a histogram of packet delay values. Given a particular histogram, the jitter buffer manager 1160 successively simulates different trial values 1122$_T$ of JBL, which may be selected based on delays represented in the histogram. The jitter buffer manager 1160 generates an overall playback quality 1152 for each trial JBL value 1122$_C$ and selects the trial JBL value 1122$_T$, across all the simulated values, that gives the best overall playback quality 1152. For example, for each trial JBL value 1122$_T$, the JBL iterator 1162 directs the impairment estimators 1140 to generate new estimates of audio quality (e.g., MOS values) given their respective inputs. Combiner 1150 combines the estimates from the impairment estimators 1140 and generates a new value of playback quality 1152 for the current trial JBL 1122$_T$. After the JBL iterator 1162 has completed simulations of all trial JBL values 1122$_T$, the JBL optimizer 1164 selects the trial JBL value for which playback quality 1152 is the greatest and sets the JBL 1122 of the jitter buffer 1120 to that JBL value. In this fashion, the jitter buffer manager 160 establishes an optimal value of jitter buffer length 1122, with optimization performed across all relevant audio factors. The result is a setting for jitter buffer length 1122 that yields the best possible conversation quality, in this case by balancing the effects of latency, packet loss, and time scaling. In some examples, JBL optimization may be performed continuously or at regular intervals, such as once per second, once per 100 ms, or once per packet received.

One should appreciate that there is no need to change the actual JBL 1122 of the jitter buffer 1120 in order to simulate performance with different trial JBL values 1122$_T$. Rather, the trial JBL values 1122$_T$ may be provided as simulated inputs to the impairment estimators 1140. The impairment estimators 1140 may then operate based on the simulated inputs, avoiding any disruption in playback that might result from changing the actual JBL 1122.

In an example, the combiner 1150 is an instance of combiner 350 of FIG. 3 and operates in a similar manner, e.g., by combining MOS values to generate an overall probability 350*a* of bad audio. This is not required, however. The combiner 1150 may optionally convert the overall probability 350*a* to a corresponding MOS value 360*a*. Such conversion to MOS is not required, however, as probability 350*a* and MOS value 360*a* are monotonically related, and this is sufficient for the arrangement of FIG. 11.

FIG. 13 shows an example method 1300 for optimizing jitter buffer length 1122. The method 1300 may be carried out using the software constructs shown in FIGS. 2 and 11, which may reside in the memory 230 of computing device 110 and may be run by the processor(s) 220. The order of acts in method 1300 may be varied, and some acts may be performed simultaneously.

At 1310, the delay histogram builder 1132 measures delays in audio packets 1112 as they arrive at receiver 1110. For example, each packet 1112 has an expected arrival time, which may be based on the sampling rate of the audio data and on the number of audio samples included in each packet. Using a local clock, the delay histogram builder 1132 measures the difference between actual arrival time and expected arrival time of each packet 1112.

Turning briefly to FIG. 14*a*, packets 1112 are seen to arrive at irregular intervals, which may arise on account of variable network delays, sometimes referred to as "jitter." Here, packets 1112 are transmitted at 10-ms intervals. Packets 1112 may arrive early or late, however, with some packets (P5 and P7) arriving very late. By tracking actual arrival times of packets 1112, the delay histogram builder 1132 can construct a table 1450 (FIG. 14*b*), which associates packets (e.g., by sequence identifiers 1212) with corresponding delay values. Two columns are shown for delay values: relative (Rel) delay and normalized (Norm) delay. Relative delay values are relative to expected values, such that positive delay values indicate packets that arrived later than expected and negative delay values indicate packets that arrived earlier than expected. Normalized delay values are shifted, so that the minimum relative delay value is assigned a value of zero, with other delay values being shifted by the same amount.

Returning to FIG. 13, the jitter buffer manager 1160 constructs a histogram 1460 (FIG. 14*c*) of the measured packet delays based on normalized delay values in the table 1450 (FIG. 14*b*). In the example shown, histogram 1460 includes one bucket 1470 for each unique value of normalized delay. The vertical axis of histogram 1460 provides a count of all the audio samples contained in the packets delayed by the respective amounts. Although histogram 1460 shows one bucket per delay value, a more generalized solution may be for each bucket 1470 to cover a respective range of delay values (e.g., 0-10 ms, 10.1-20 ms, or 20.1-30 ms, etc.) and to count the number of audio samples arriving in packets whose delays fall within the respective delay range. One should appreciate that the histogram 1460 may alternatively be represented as a CDF (cumulative distribution function), which is regarded herein as a type of histogram.

At 1330, the jitter buffer manager 1160 iterates over the buckets 1470 in the histogram 1460 and, for each bucket, generates a prediction of audio playback quality assuming a trial jitter buffer length 1122$_T$ set to the normalized packet delay as represented by the respective bucket. For example, the jitter buffer manager 1160 starts at a trial jitter buffer length 1122$_T$ of zero, and generates overall playback quality 1160. Next, the jitter buffer manager 1160 sets the trial jitter buffer length 1122$_T$ to 1 ms (the next bucket value) and repeats, eventually proceeding to 2 ms, 3 ms, 4 ms, 5 ms, 7 ms, 10 ms, 12 ms, 28 ms, and 60 ms. One should appreciate that the scale of delay values may differ from that shown, with the particular examples being merely illustrative.

In an example, the jitter buffer manager 1160 generates a prediction of playback quality for each bucket 1470 by following acts 1332, 1334, and 1336. At 1332, the jitter buffer manager 1160 measures or otherwise obtains a set of audio factors with the trial jitter buffer length 1122$_T$ set based on the normalized delay of the current bucket 1470. For instance, the jitter buffer manager 1160 directs the DIE 1140*a*, LIE 1140*b*, and TIE 1140*c* to generate respective audio quality estimates for the current trial jitter buffer length 1122$_T$. At 1334, the jitter buffer manager 1160 transforms each of the measured audio factors into a corresponding MOS value. In the example shown, such transforming may be performed internally by the DIE, LIE, and TIE, e.g., in the manner described in Section I for the MOS assigner 144. At 1336, combiner 1150 combines the MOS values from the DIE, LIE, and TIE to generate an overall estimate 1152 of playback quality, which provides the prediction for the current bucket 1470. The acts 1332, 1334, and 1336 may then be repeated for each bucket 1170 in the histogram 1460, with each bucket 1470 thereby being associated with a respective trial JBL 1122$_T$ and with a respective prediction 1152 of audio playback quality.

At 1340, the jitter buffer manager 1160 sets the actual jitter buffer length 1122 of the jitter buffer 1120 based on the normalized delay of the bucket 1470 that yields the highest audio quality prediction. For example, if the bucket 1470 that represents 28 ms of normalized delay produces the highest prediction, the jitter buffer manager 1160 sets the actual jitter buffer length 1122 to 28 ms. The computing device 110 then proceeds to conduct the communication session with the jitter buffer 1120 set to 28 ms.

The process 1300 may be performed continuously (e.g., by restarting immediately after it finishes) or on some regular basis, such as once per second. It may also be performed upon arrival of each new packet that conveys audio, for example. One should appreciate that the depictions of FIGS. 14*a*-14*c* are not necessarily to scale, but rather are intended to show principles of operation. For example, jitter in packet delays may be much larger than shown.

In some examples, act 1330 may perform its iterative operation on fewer than all buckets 1170 in the histogram 1160. For example, the bucket corresponding to a normalized delay of zero can typically be ignored, as that bucket is unlikely to produce the optimal playback quality. Preferably, act 1330 limits its activity to only those buckets 1170 that have non-zero counts. We have recognized that network delays tend to be consistent over the short term, such that delays measured for a current run of method 1300 are generally similar to those measured for an immediately previous run. Limiting operation to buckets having non-zero counts thus tends to avoid wasteful computation.

Figure 15:
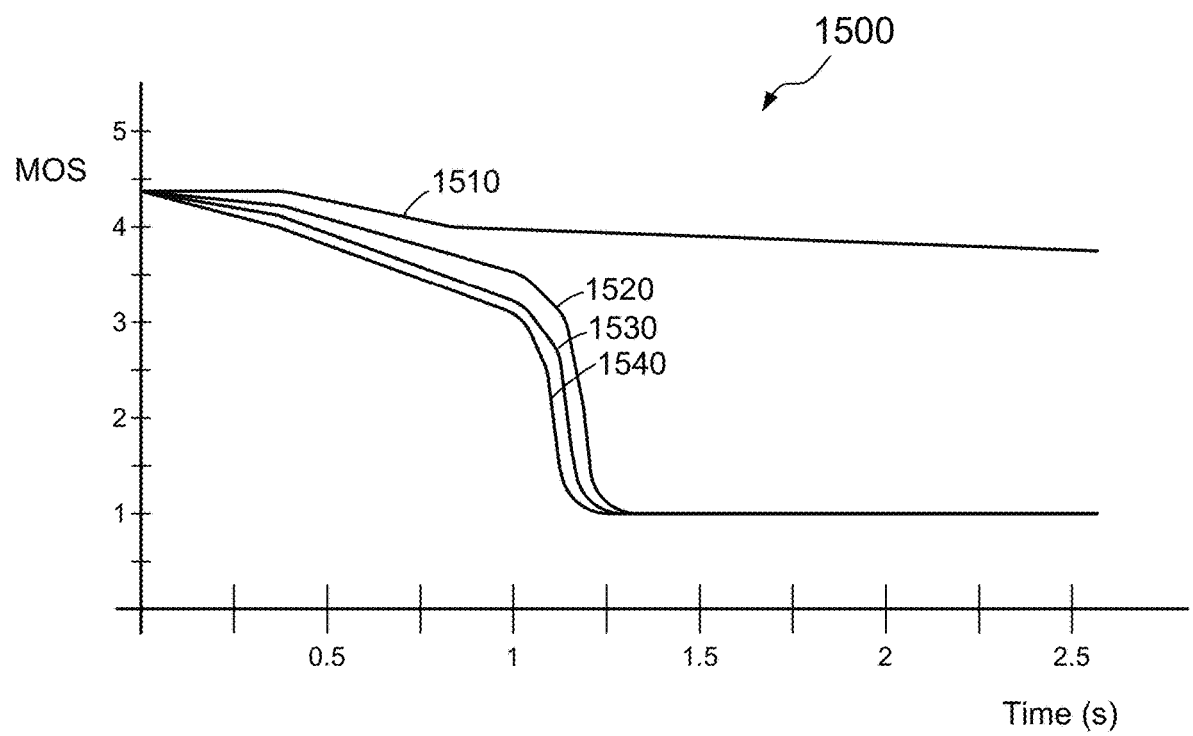
FIG. 15 is a graph showing example relationships between MOS values and latency for communication sessions having different levels of interactivity.

FIG. 15 shows typical relationships between MOS values, latency, and interactivity, and such relationships may provide a basis for operation of the DIE 1140*a*. In the example shown, curves 1510, 1520, 1530, and 1540 have been derived based on the E-model (described above) for different communication scenarios, which range from non-interactive (curve 1510) to highly interactive (curve 1540). As shown, MOS declines steeply for interactive sessions when latency exceeds one second. In accordance with some examples, DIE 1140*a* applies curves 1510, 1520, 1530, and 1540 in generating MOS values. Audio interactivity measure 1136*a* may provide a suitable measure of interactivity for selecting the appropriate curve, and trial jitter buffer length $1222_T$ may provide a measure of delay (or a component of total delay, which also includes other factors). These inputs may allow the DIE 1140*a* to generate a corresponding MOS value by performing a simple lookup.

Figure 16:
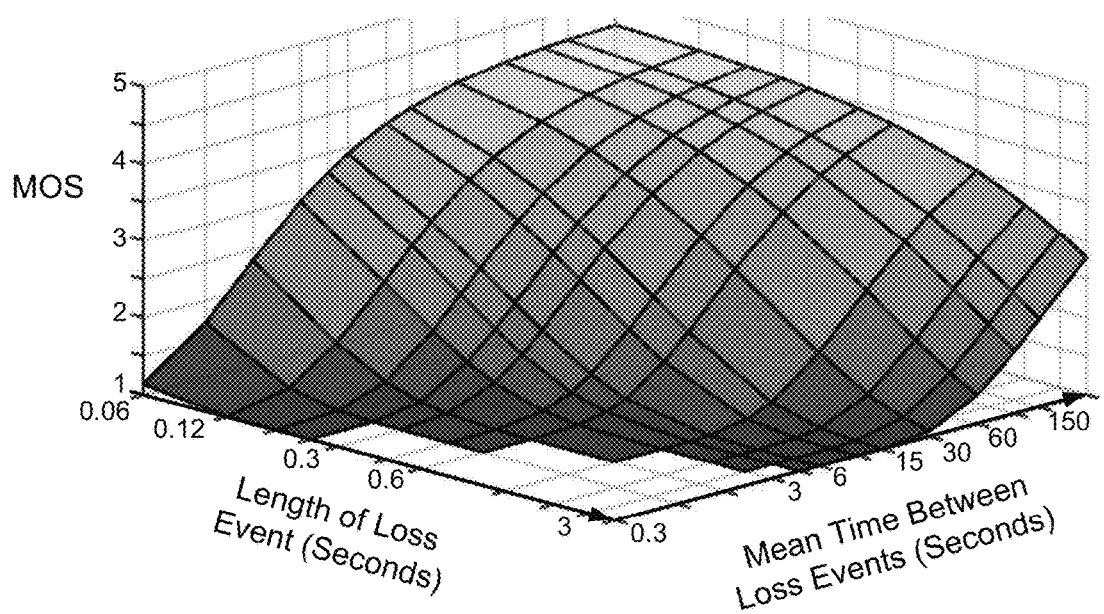
FIG. 16 is a graph showing an example relationship between MOS values and parameters associated with packet loss.

FIG. 16 shows example relationships between MOS values and packet loss, as measured by length of loss event and mean time between loss events, and provides a basis for operation of the LIE 1140*b*. In an example, "Length of Loss Event" as shown in FIG. 16 is the same as mean loss length 1136*a* in FIG. 11. Also, "Mean Time Between Loss Events" in FIG. 16 may be computed based on mean loss length 1136*a* divided by network loss rate 1134*b*. By analyzing incoming packets for a particular trial JBL $1122_T$, the loss parameter estimator 1134 can generate both mean-loss length 1134*a* and loss rate 1134*b*, enabling the LIE 1140*b* to obtain a MOS value, again by performing a simple lookup.

Figure 17:
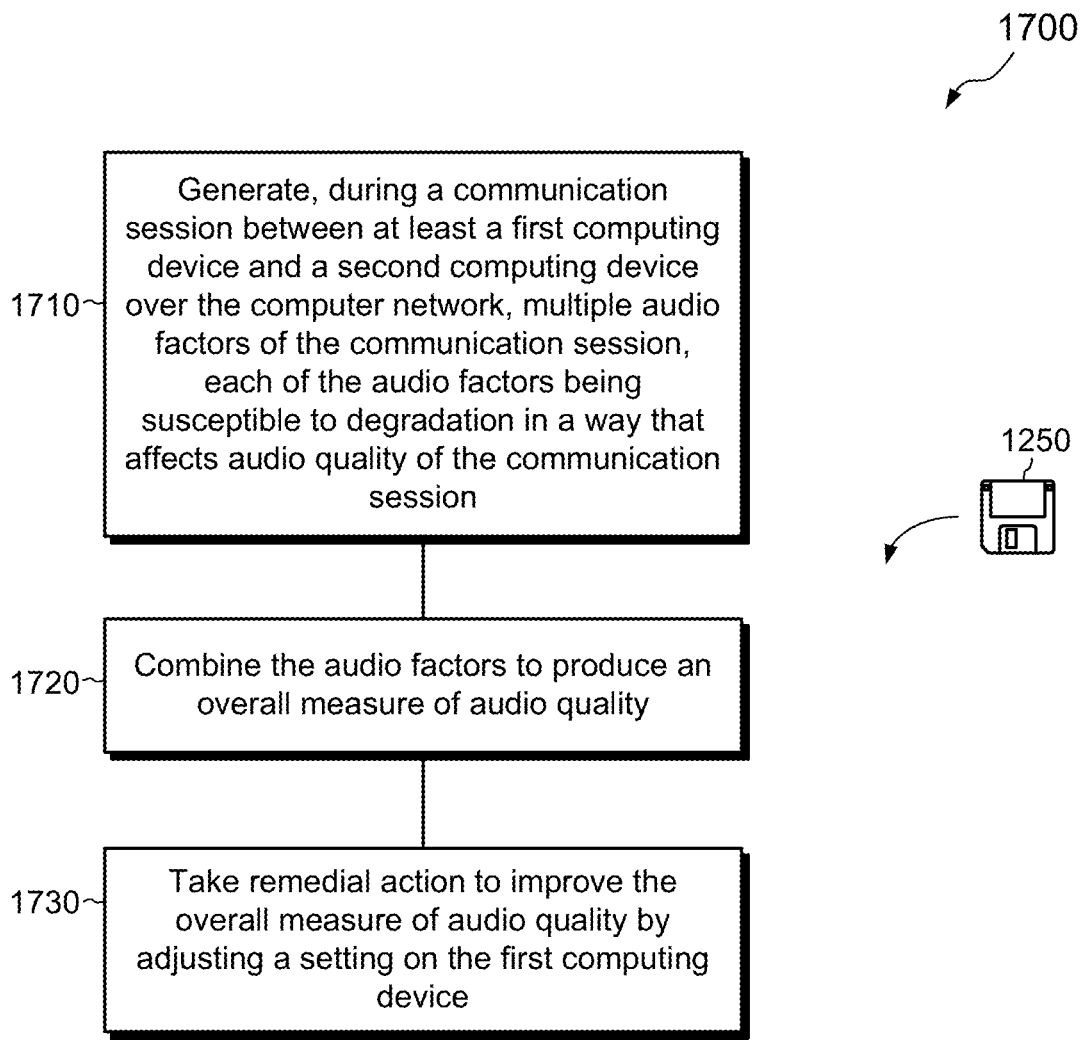
FIG. 17 is a flowchart showing an example method of managing real-time communications.

FIG. 17 shows an example method 1700 for managing real-time communications and provides a summary of some of the features described above. The method 1700 may be carried out using the software constructs shown in FIGS. 2 and 11, which may reside in the memory 230 of computing device 110 and be run by the processor(s) 220.

At 1710, multiple audio factors 1142 are generated of a communication session between at least a first computing device 110(1) and a second computing device 110(2) over the computer network 120. Each of the audio factors 1142 is susceptible to degradation in a way that affects audio quality of the communication session.

At 1720, the audio factors 1142 are combined, e.g., by operation of combiner 1150, to produce an overall measure 1152 of audio quality.

At 1730, remedial action are taken to improve the overall measure 1152 of audio quality by adjusting a setting, such as jitter buffer length 1120, on the first computing device 110(1).

Having described certain embodiments, numerous alternative embodiments or variations can be made. For example, although the above disclosure has presented techniques for adjusting the length of a jitter buffer, other settings may be adjusted in addition or instead. These may include, without limitation, parameters of decoder 1130, volume, frequency response, sampling rate, and the like. Also, although examples herein have focused on a communication session that takes place between a first computing device and a second computing device, the invention may also be employed in communications involving more than two computing devices. Each computing device may generate its own optimal jitter buffer length 1122, and the jitter buffer lengths 1122 of the different computing devices need not be the same.

Further, although features are shown and described with reference to particular embodiments, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as media 850 and 1350 in FIGS. 8 and 13). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of improving audio quality in real-time communications over a computer network, the method comprising:

providing a jitter buffer configured to temporarily hold audio data received by a computing device over a computer network;

measuring packet delays of a plurality of packets received by the computing device, each of the plurality of packets carrying a respective set of audio samples;

constructing a histogram of the measured packet delays, the histogram including a set of buckets, each bucket representing a respective packet delay range and counting a number of audio samples that arrived in packets having delays within the respective packet delay range;

for each of the set of buckets, generating a prediction of audio playback quality for a trial jitter buffer length set based on the packet delay range represented by the respective bucket; and setting a length of the jitter buffer based on an identified trial jitter buffer length for which a highest audio playback quality is predicted.

2. A method of improving audio quality in real-time communications over a computer network, the method comprising:

generating, during a communication session between at least a first computing device and a second computing device over the computer network, multiple audio factors of the communication session, each of the audio factors reflecting a respective characteristic that is susceptible to degradation;

combining the audio factors to produce an overall measure of audio quality; and taking remedial action to improve the overall measure of audio quality by adjusting a jitter buffer length of a jitter buffer configured to temporarily hold audio data received by the first computing device over the computer network prior to decoding the audio data, wherein the audio factors include a delay impairment factor generated by a delay impairment estimator, the delay impairment estimator:

receiving a first input that provides a current jitter buffer length;

receiving a second input that indicates a measure of audio interactivity between the first computing device and the second computing device; and providing an output that conveys a measure of audio quality based on the first input and the second input.

3. The method of claim 2, wherein the audio data includes audio samples and is received in multiple packets having respective sequence identifiers, the sequence identifiers indicating an order in which the packets are generated, and wherein the method further comprises:

ordering the audio samples in the jitter buffer based on the sequence identifiers of the packets; and providing the ordered audio samples to an audio decoder configured to decode the audio data.

4. The method of claim 3, wherein a sequence identifier of a respective packet includes a sample index of an audio sample transmitted in the respective packet, the sample index increasing monotonically for successive audio samples.

5. The method of claim 3, wherein the ordered audio data includes a gap where a packet is missing, and wherein the method further comprises:

receiving the missing packet after the decoder has processed a portion of the ordered audio data corresponding to the gap; and discarding the missing packet after it has been received.

6. The method of claim 2, further comprising performing a jitter-buffer-length optimization by:

measuring packet delays of a plurality of packets received by the first computing device, each of the plurality of packets carrying a respective set of audio samples;

constructing a histogram of the measured packet delays, the histogram including a set of buckets, each bucket representing a respective packet delay range and counting a number of audio samples that arrived in packets having delays within the respective packet delay range;

for each of the set of buckets, generating a prediction of audio playback quality for a trial jitter buffer length set based on the packet delay range represented by the respective bucket;

identifying a trial jitter buffer length for which a highest audio playback quality is predicted; and setting the jitter buffer length based on the identified trial jitter buffer length.

7. The method of claim 6, wherein generating the prediction of audio playback quality includes, for each of the set of buckets:

providing a set of audio factors for the trial jitter buffer length set based on the packet delay range represented by the respective bucket;

transforming each of the set of audio factors for the respective bucket into a corresponding MOS (Mean Opinion Score) value, each MOS value providing a standardized measure of audio quality; and combining the set of MOS values to generate the prediction of audio playback quality for the respective bucket.

8. The method of claim 6, wherein the audio factors further include a loss impairment factor generated by a loss impairment estimator, the loss impairment estimator:

receiving an input that provides a current jitter buffer length;

tracking gaps in audio data, the gaps arising from packets that were expected but did not arrive within the current jitter buffer length; and providing an output that conveys a measure of audio quality based on the current jitter buffer length and the gaps.

9. The method of claim 6, wherein the audio factors further include a time-scaling impairment factor generated by a time-scaling impairment estimator, the time-scaling impairment estimator:

receiving input that indicates a difference between a current jitter buffer length and a target jitter buffer length; and providing an output that conveys a measure of audio quality based on performing time scaling from the current jitter buffer length to the target jitter buffer length.

10. The method of claim 2, wherein the audio factors further include a loss impairment factor generated by a loss impairment estimator, the loss impairment estimator:

receiving an input that provides a current jitter buffer length;

tracking gaps in audio data, the gaps arising from packets that were expected but did not arrive within the current jitter buffer length; and providing an output that conveys a measure of audio quality based on the current jitter buffer length and the gaps.

11. The method of claim 2, wherein the audio factors further include a time-scaling impairment factor generated by a time-scaling impairment estimator, the time-scaling impairment estimator:

receiving input that indicates a difference between a current jitter buffer length and a target jitter buffer length; and providing an output that conveys a measure of audio quality based on performing time scaling from the current jitter buffer length to the target jitter buffer length.

12. The method of claim 2, wherein the delay impairment estimator further receives a third input that indicates a two-way mouth-to-ear (MTE) delay between the first computing device and the second computing device, and wherein the output is further based on a two-way mouth-to-ear (MTE) delay.

13. The method of claim 2, wherein combining the audio factors to produce the overall measure of audio quality includes:

transforming the audio factors into corresponding MOS (Mean Opinion Score) values, each MOS value providing a standardized measure of audio quality; and combining the MOS values to generate the overall measure of audio quality.

14. A computer program product including a set of non-transitory, computer-readable media having instructions which, when executed by control circuitry of a first computing device, cause the control circuitry to perform a method of improving audio quality in real-time communications over a computer network, the method comprising:

generating, during a communication session between at least the first computing device and a second computing device over the computer network, multiple audio factors of the communication session, each of the audio factors reflecting a respective characteristic that is susceptible to degradation;

combining the audio factors to produce an overall measure of audio quality; and taking remedial action to improve the overall measure of audio quality by adjusting a jitter buffer length of a jitter buffer configured to temporarily hold audio data received by the first computing device over the computer network prior to decoding the audio data, wherein the audio factors include a loss impairment factor generated by a loss impairment estimator, the loss impairment estimator:

receiving an input that provides a current jitter buffer length;

tracking gaps in audio data, the gaps arising from packets that were expected but did not arrive within the current jitter buffer length; and providing an output that conveys a measure of audio quality based on the current jitter buffer length and the gaps.

15. The computer program product of claim 14, wherein the method further comprises performing a jitter-buffer-length optimization by:

measuring packet delays of a plurality of packets received by the first computing device, each of the plurality of packets carrying a respective set of audio samples;

constructing a histogram of the measured packet delays, the histogram including a set of buckets, each bucket representing a respective packet delay range and counting a number of the audio samples that arrived in packets having delays within the respective packet delay range;

for each of the set of buckets, generating a prediction of audio playback quality for a trial jitter buffer length set based on the packet delay range represented by the respective bucket;

identifying a trial jitter buffer length for which a highest audio playback quality is predicted; and setting the jitter buffer length based on the identified trial jitter buffer length.

16. The computer program product of claim 15, wherein generating the prediction of audio playback quality includes, for each of the set of buckets:

providing a set of audio factors for the trial jitter buffer length set based on the packet delay range represented by the respective bucket;

transforming each of the set of audio factors for the respective bucket into a corresponding MOS (Mean Opinion Score) value, each MOS value providing a standardized measure of audio quality; and combining the set of MOS values to generate the prediction of audio playback quality for the respective bucket.

17. The computer program product of claim 14, wherein the audio factors further include a delay impairment factor generated by a delay impairment estimator, the delay impairment estimator:

receiving a first input that provides a current jitter buffer length;

receiving a second input that indicates a measure of audio interactivity between the first computing device and the second computing device; and providing an output that conveys a measure of audio quality based on the first input and the second input.

18. The computer program product of claim 14, wherein the audio factors further include a time-scaling impairment factor generated by a time-scaling impairment estimator, the time-scaling impairment estimator:

receiving input that indicates a difference between a current jitter buffer length and a target jitter buffer length; and providing an output that conveys a measure of audio quality based on performing time scaling from the current jitter buffer length to the target jitter buffer length.

19. A method of improving audio quality in real-time communications over a computer network, the method comprising:

generating, during a communication session between at least a first computing device and a second computing device over the computer network, multiple audio factors of the communication session, each of the audio factors reflecting a respective characteristic that is susceptible to degradation;

combining the audio factors to produce an overall measure of audio quality; and taking remedial action to improve the overall measure of audio quality by adjusting a jitter buffer length of a jitter buffer configured to temporarily hold audio data received by the first computing device over the computer network prior to decoding the audio data, wherein the audio factors include a time-scaling impairment factor generated by a time-scaling impairment estimator, the time-scaling impairment estimator:

receiving input that indicates a difference between a current jitter buffer length and a target jitter buffer length; and providing an output that conveys a measure of audio quality based on performing time scaling from the current jitter buffer length to the target jitter buffer length.

* * * * *